US008696772B2

(12) United States Patent
Edlund et al.

(10) Patent No.: US 8,696,772 B2
(45) Date of Patent: Apr. 15, 2014

(54) STEAM REFORMING FUEL PROCESSOR, BURNER ASSEMBLY, AND METHODS OF OPERATING THE SAME

(75) Inventors: David J. Edlund, Hopkinton, MA (US); Darrell J. Elliott, Bend, OR (US); Alan E. Hayes, Bend, OR (US); William A. Pledger, Bend, OR (US); Curtiss Renn, Bend, OR (US); Redwood Stephens, Bend, OR (US); R. Todd Studebaker, Chubbuck, ID (US)

(73) Assignee: DCNS SA, La Montagne (FR)

(*) Notice: Subject to any disclaimer, the term of this patent is extended or adjusted under 35 U.S.C. 154(b) by 68 days.

(21) Appl. No.: 13/166,576

(22) Filed: Jun. 22, 2011

(65) Prior Publication Data

US 2011/0256491 A1    Oct. 20, 2011

Related U.S. Application Data

(62) Division of application No. 12/428,660, filed on Apr. 23, 2009, now Pat. No. 7,981,172, which is a division of application No. 10/412,709, filed on Apr. 10, 2003, now abandoned, said application No. 13/166,576 is a division of application No. 12/044,799, filed on Mar. 7, 2008, now Pat. No. 7,828,864, which is a division of application No. 10/412,709, filed on Apr. 20, 2003, now abandoned.

(60) Provisional application No. 60/372,748, filed on Apr. 14, 2002, provisional application No. 60/392,397, filed on Jun. 27, 2002.

(51) Int. Cl.
*C01B 6/24* (2006.01)
*B01J 7/00* (2006.01)

(52) U.S. Cl.
USPC ............ 48/61; 422/625; 48/197 R; 423/644; 423/650

(58) Field of Classification Search
USPC ............................................. 48/61
See application file for complete search history.

(56) References Cited

U.S. PATENT DOCUMENTS 2,824,620 A    2/1958  De Rosset
3,094,391 A    6/1963  Mader
(Continued)

FOREIGN PATENT DOCUMENTS

CA    1169753       6/1984
EP    1065741 A2    1/2001
(Continued)

OTHER PUBLICATIONS

English-language abstract of Japanese Patent No. 5132301, 1993.
(Continued)

*Primary Examiner* — Matthew Merkling
(74) *Attorney, Agent, or Firm* — Dascenzo Intellectual Property Law, P.C.

(57) ABSTRACT

Systems and methods for producing hydrogen gas with a fuel processing system that includes a hydrogen-producing region that produces hydrogen gas from a feed stream and a heating assembly that consumes a fuel stream to produce a heated exhaust stream for heating the hydrogen-producing region. In some embodiments, the heating assembly heats the hydrogen-producing region to at least a minimum hydrogen-producing temperature. In some embodiments, the rate at which an air stream is delivered to the heating assembly is controlled to selectively increase or decrease the temperature of the heated exhaust stream. In some embodiments, the feed stream and the fuel stream both contain a carbon-containing feedstock and at least 25 wt % water. In some embodiments, the feed and fuel streams have the same composition.

19 Claims, 20 Drawing Sheets

(56) References Cited

U.S. PATENT DOCUMENTS

| | | | |
|---|---|---|---|
| 3,144,312 A | 8/1964 | Mertens |
| 3,336,730 A | 8/1967 | McBride et al. |
| 3,338,681 A | 8/1967 | Kordesch |
| 3,350,176 A | 10/1967 | Green et al. |
| 3,469,944 A | 9/1969 | Bocard et al. |
| 3,522,019 A | 7/1970 | Buswell et al. |
| 3,787,038 A | 1/1974 | Tesner et al. |
| 3,920,416 A | 11/1975 | Houseman |
| 3,955,941 A | 5/1976 | Houseman et al. |
| 3,982,910 A | 9/1976 | Houseman et al. |
| 4,024,912 A | 5/1977 | Hamrick et al. |
| 4,071,330 A | 1/1978 | Sederquist |
| 4,084,934 A | 4/1978 | Kumazawa |
| 4,098,587 A | 7/1978 | Krar et al. |
| 4,098,588 A | 7/1978 | Buswell et al. |
| 4,098,589 A | 7/1978 | Buswell et al. |
| 4,098,959 A | 7/1978 | Fanciullo |
| 4,098,960 A | 7/1978 | Gagnon |
| 4,113,445 A | 9/1978 | Gettert et al. |
| 4,134,739 A | 1/1979 | Gulden et al. |
| 4,203,950 A | 5/1980 | Sederquist |
| 4,214,969 A | 7/1980 | Lawrance |
| 4,238,403 A | 12/1980 | Pinto |
| 4,292,274 A | 9/1981 | Faitani et al. |
| 4,302,177 A | 11/1981 | Fankhanel et al. |
| 4,331,520 A | 5/1982 | Juda et al. |
| 4,400,182 A | 8/1983 | Davies et al. |
| 4,430,304 A | 2/1984 | Spurrier et al. |
| 4,468,235 A | 8/1984 | Hill |
| 4,473,622 A | 9/1984 | Chludzinski et al. |
| 4,504,447 A | 3/1985 | Spurrier et al. |
| 4,509,915 A | 4/1985 | Ito |
| 4,533,607 A | 8/1985 | Sederquist |
| 4,567,857 A | 2/1986 | Houseman et al. |
| 4,657,828 A | 4/1987 | Tajima |
| 4,659,634 A | 4/1987 | Struthers |
| 4,692,306 A | 9/1987 | Minet et al. |
| 4,699,637 A | 10/1987 | Iniotakis et al. |
| 4,717,332 A | 1/1988 | Edens |
| 4,788,004 A | 11/1988 | Pinto et al. |
| 4,838,897 A | 6/1989 | Amano et al. |
| 4,849,187 A | 7/1989 | Uozu et al. |
| 4,981,676 A | 1/1991 | Minet et al. |
| 5,006,425 A | 4/1991 | Takabayashi |
| 5,062,792 A | 11/1991 | Maghon |
| 5,112,219 A | 5/1992 | Hiemstra |
| 5,226,928 A | 7/1993 | Makabe et al. |
| 5,229,102 A | 7/1993 | Minet et al. |
| 5,392,745 A | 2/1995 | Beck |
| 5,401,589 A | 3/1995 | Palmer et al. |
| RE35,002 E | 7/1995 | Matsubara et al. |
| 5,432,710 A | 7/1995 | Ishimaru et al. |
| 5,456,216 A * | 10/1995 | Kaji et al. ............. 431/181 |
| 5,470,360 A | 11/1995 | Sederquist |
| 5,516,344 A | 5/1996 | Corrigan |
| 5,624,964 A | 4/1997 | Cimini et al. |
| 5,628,931 A | 5/1997 | Lednor et al. |
| 5,637,414 A | 6/1997 | Inoue et al. |
| 5,639,431 A | 6/1997 | Shirasaki et al. |
| 5,744,067 A | 4/1998 | Jahnke |
| 5,811,065 A | 9/1998 | Sterenberg |
| 5,833,723 A | 11/1998 | Kuwabara et al. |
| 5,861,137 A | 1/1999 | Edlund |
| 5,932,141 A | 8/1999 | Rostrop-Nielsen et al. |
| 5,938,800 A | 8/1999 | Verrill et al. |
| 5,997,594 A | 12/1999 | Edlund et al. |
| 5,998,053 A | 12/1999 | Diethelm |
| 6,042,956 A | 3/2000 | Lenel |
| 6,045,772 A | 4/2000 | Szydlowski et al. |
| 6,077,620 A | 6/2000 | Pettit |
| 6,083,637 A | 7/2000 | Walz et al. |
| 6,103,411 A | 8/2000 | Matsubayashi et al. |
| 6,152,995 A | 11/2000 | Edlund |
| 6,165,633 A | 12/2000 | Negishi |
| 6,183,895 B1 | 2/2001 | Kudo et al. |
| 6,190,623 B1 | 2/2001 | Sanger et al. |
| 6,201,029 B1 | 3/2001 | Waycuilis |
| 6,221,117 B1 | 4/2001 | Edlund et al. |
| 6,224,789 B1 | 5/2001 | Dybkjaer |
| 6,242,120 B1 | 6/2001 | Herron |
| 6,294,149 B1 | 9/2001 | Autenrieth et al. |
| 6,319,306 B1 | 11/2001 | Edlund et al. |
| 6,328,945 B1 | 12/2001 | Hufton et al. |
| 6,347,936 B1 | 2/2002 | Young et al. |
| 6,348,278 B1 | 2/2002 | LaPierre et al. |
| 6,375,906 B1 | 4/2002 | Edlund et al. |
| 6,376,113 B1 | 4/2002 | Edlund et al. |
| 6,383,670 B1 | 5/2002 | Edlund et al. |
| 6,419,728 B1 | 7/2002 | Edlund |
| 6,451,464 B1 | 9/2002 | Edlund et al. |
| 6,458,189 B1 | 10/2002 | Edlund et al. |
| 6,461,408 B2 | 10/2002 | Buxbaum |
| 6,465,118 B1 | 10/2002 | Dickman et al. |
| 6,494,937 B1 | 12/2002 | Edlund et al. |
| 6,495,277 B1 | 12/2002 | Edlund et al. |
| 6,537,352 B2 | 3/2003 | Edlund et al. |
| 6,551,380 B1 | 4/2003 | Reddy et al. |
| 6,576,217 B1 | 6/2003 | Nojima et al. |
| 6,890,672 B2 | 5/2005 | Dickman et al. |
| 6,893,255 B2 | 5/2005 | Grob et al. |
| 6,964,692 B2 | 11/2005 | Gittleman et al. |
| 2001/0014414 A1 | 8/2001 | Okamoto et al. |
| 2001/0031387 A1 | 10/2001 | Takeda et al. |
| 2002/0041837 A1 | 4/2002 | Edlund et al. |

FOREIGN PATENT DOCUMENTS

| | | |
|---|---|---|
| EP | 1085261 | 3/2001 |
| EP | 1061039 | 3/2004 |
| JP | 57-145276 | 9/1982 |
| JP | 4-338101 | 11/1992 |
| JP | 11-281014 | 10/1999 |
| JP | 2000-351607 | 12/2000 |
| JP | 2001-296017 | 10/2001 |
| WO | WO 99/65097 | 12/1999 |
| WO | WO 00/22690 | 4/2000 |
| WO | WO 00/27518 | 5/2000 |
| WO | WO 01/68514 | 9/2001 |
| WO | WO 01/70376 A1 | 9/2001 |
| WO | WO 02/23089 | 3/2002 |

OTHER PUBLICATIONS

English-language abstract of Japanese Patent No. 514790, 1993.
English-language abstract of Japanese Patent No. 710910, 1995.
English-language abstract of Japanese Patent No. 828793, 1996.
English-language abstract of Japanese Patent No. 4-338101.
English-language abstract of Great Britain Patent No. 2,305,186.
Emonts, B., et al., "Compact Methanol Reformer Test for Fuel-Cell Powered Light-Duty Vehicles," Fifth Grove Fuel Cell Symposium, Commonwealth Institute, London, U.K., p. 42 (Sep. 22-25, 1997).
English-language abstract of publication No. JP11-281014, Oct. 15, 1999.
Fig. 1 of Taiwan Patent Publication No. 301473, undated, which was cited in a communication received Jul. 21, 2004 from a foreign patent office in a counterpart foreign application.

* cited by examiner

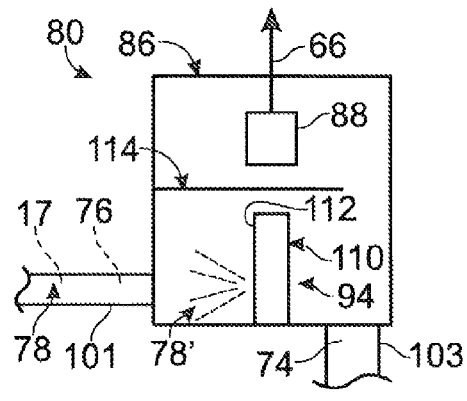
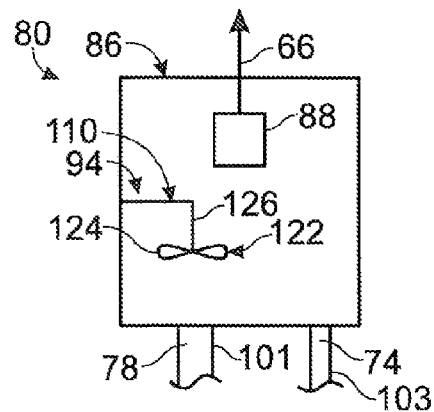
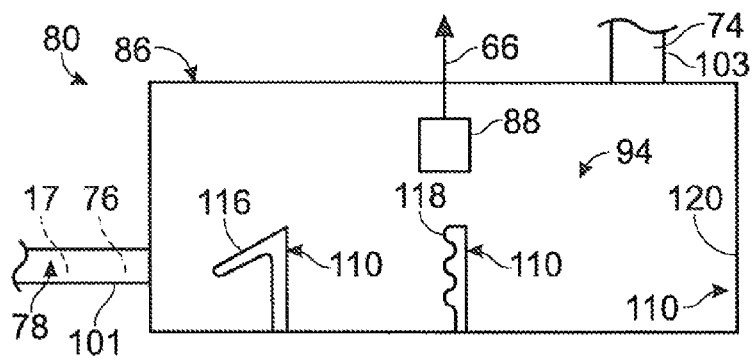
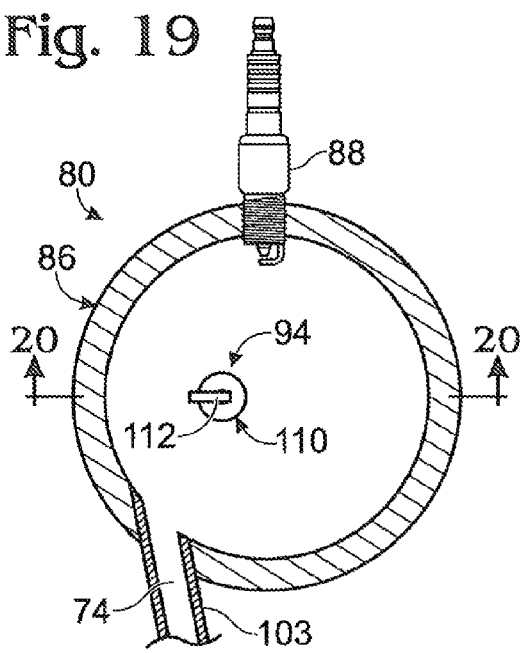
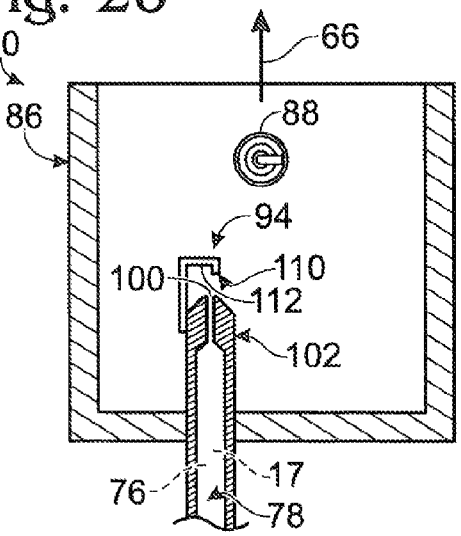

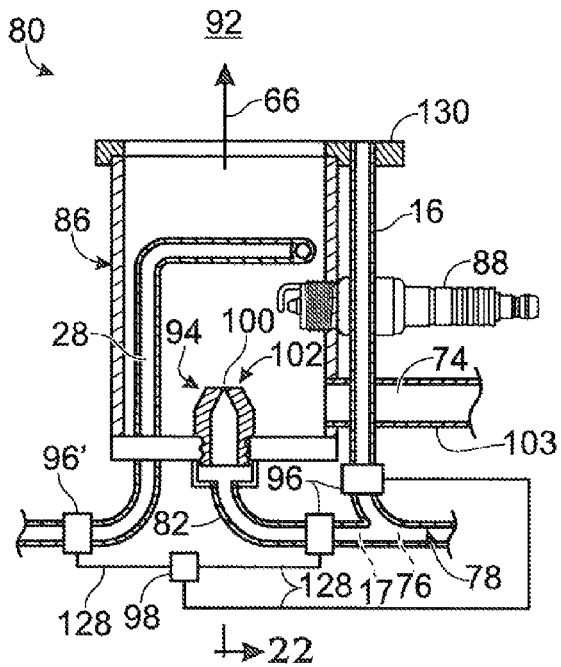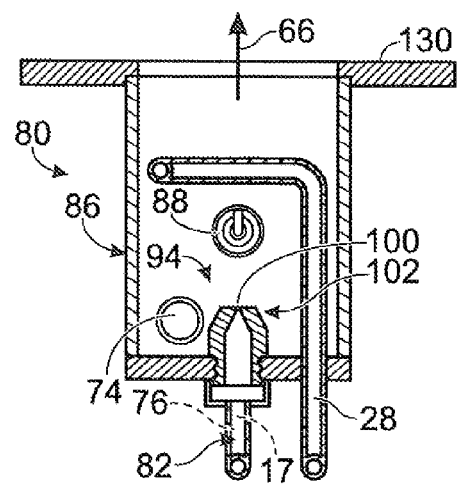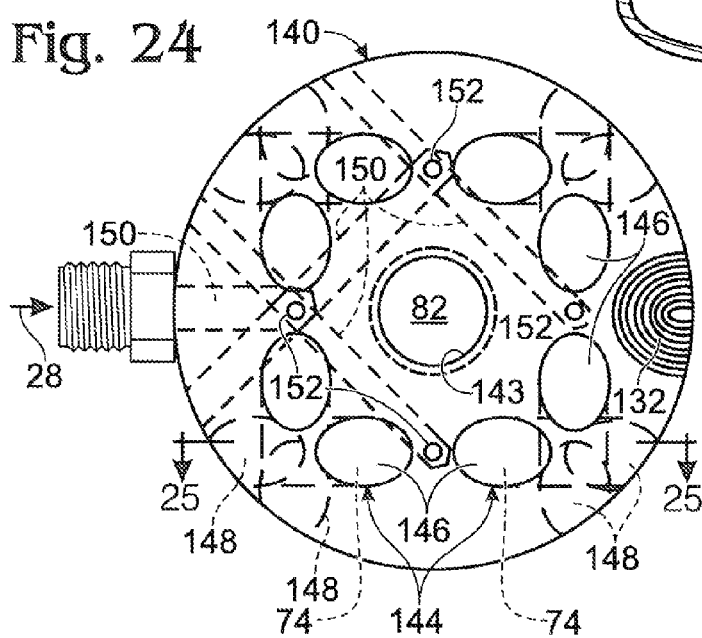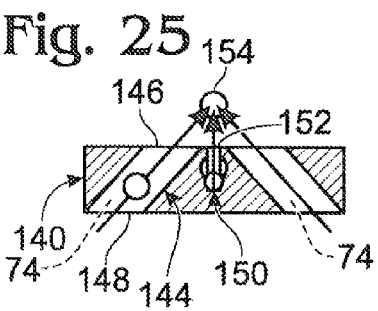

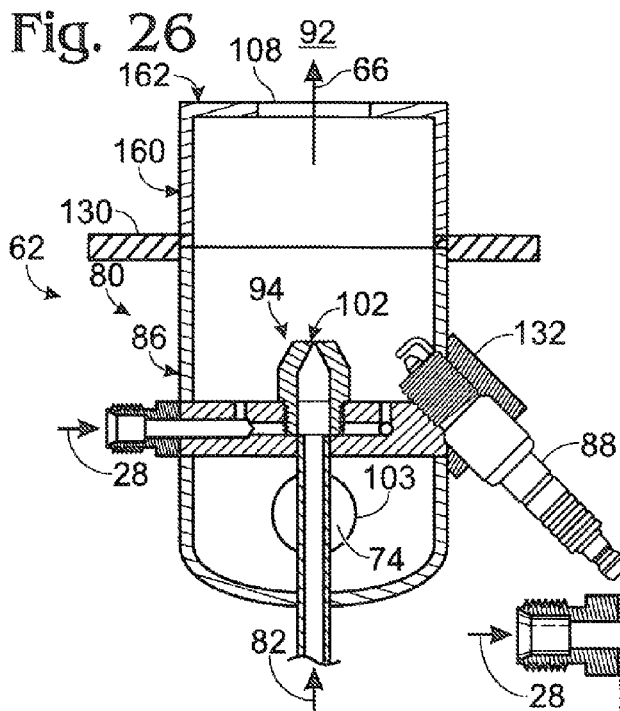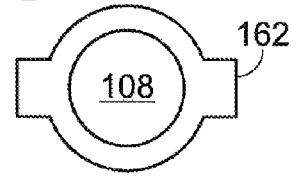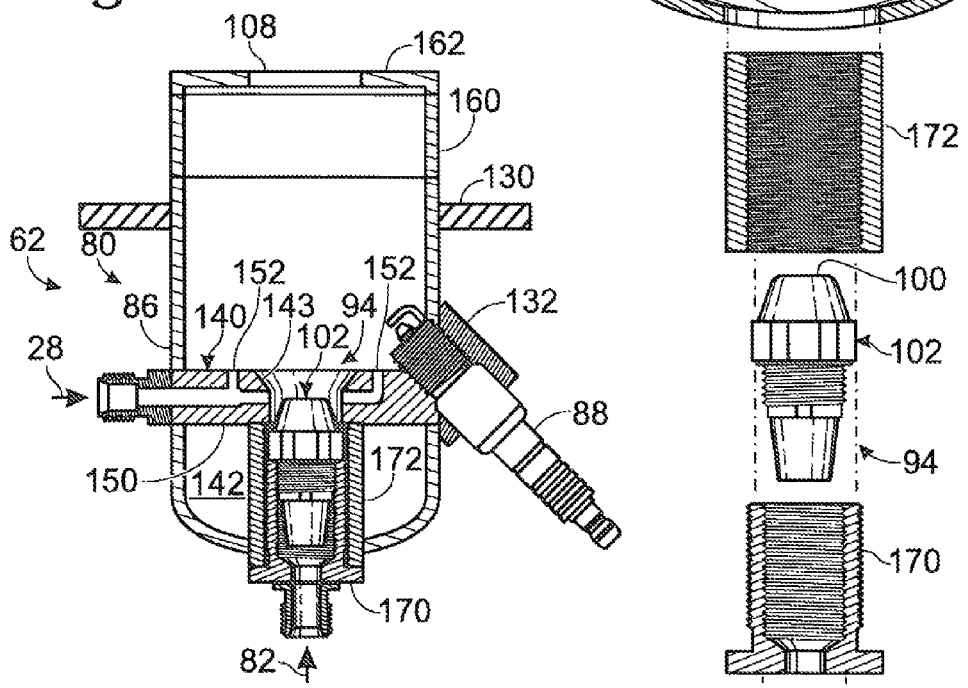

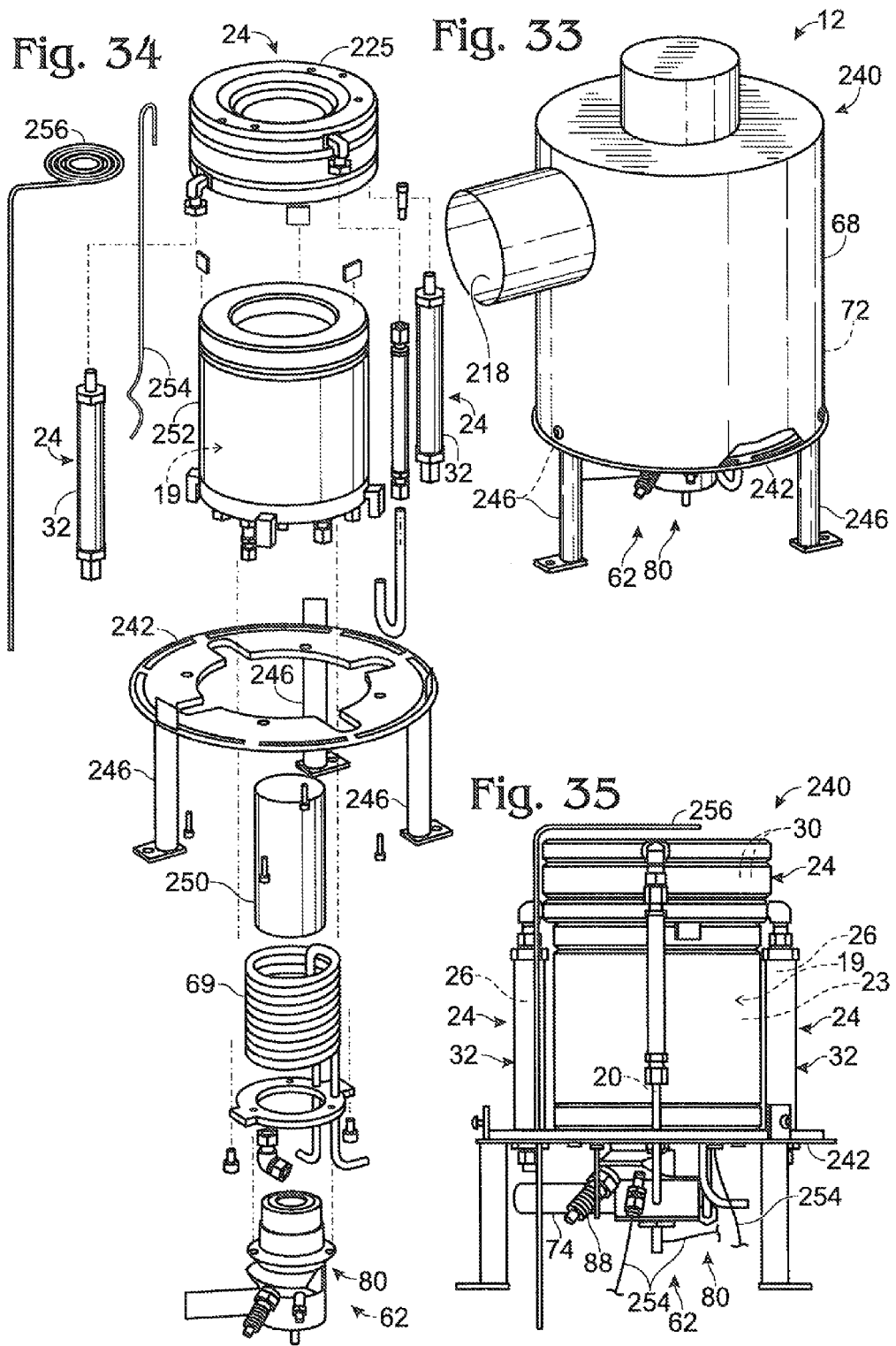

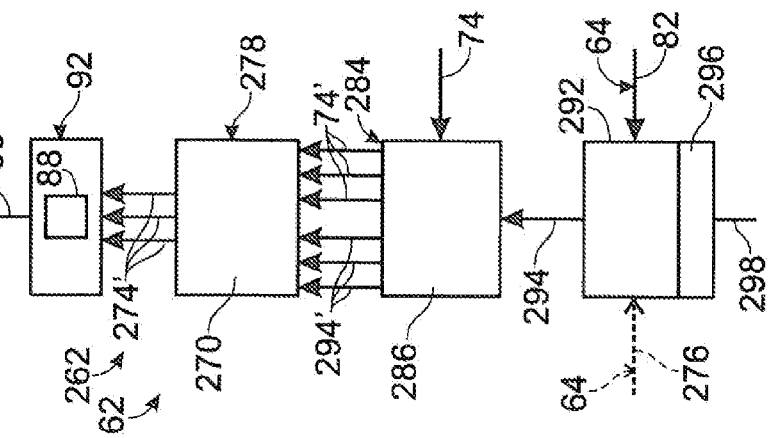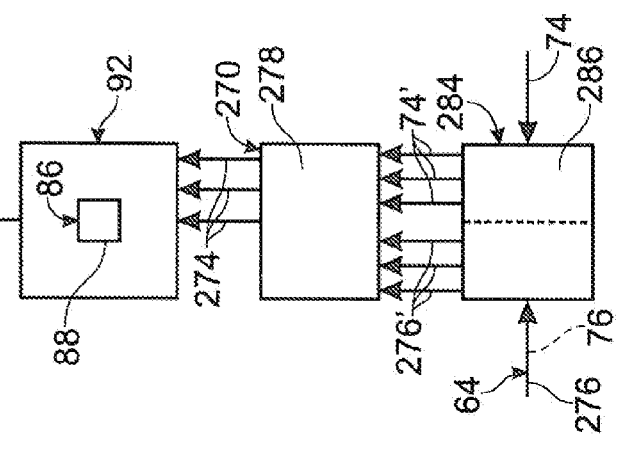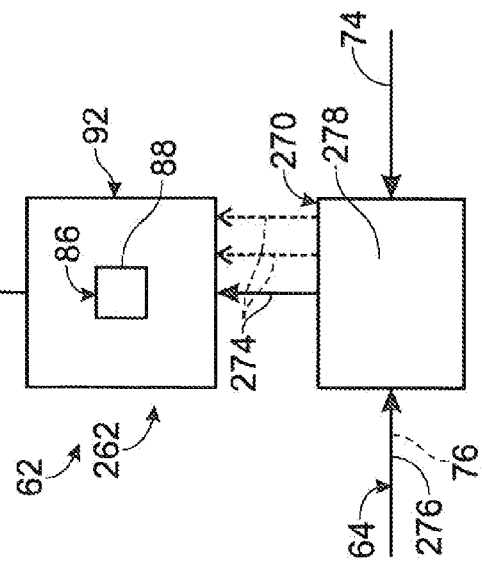

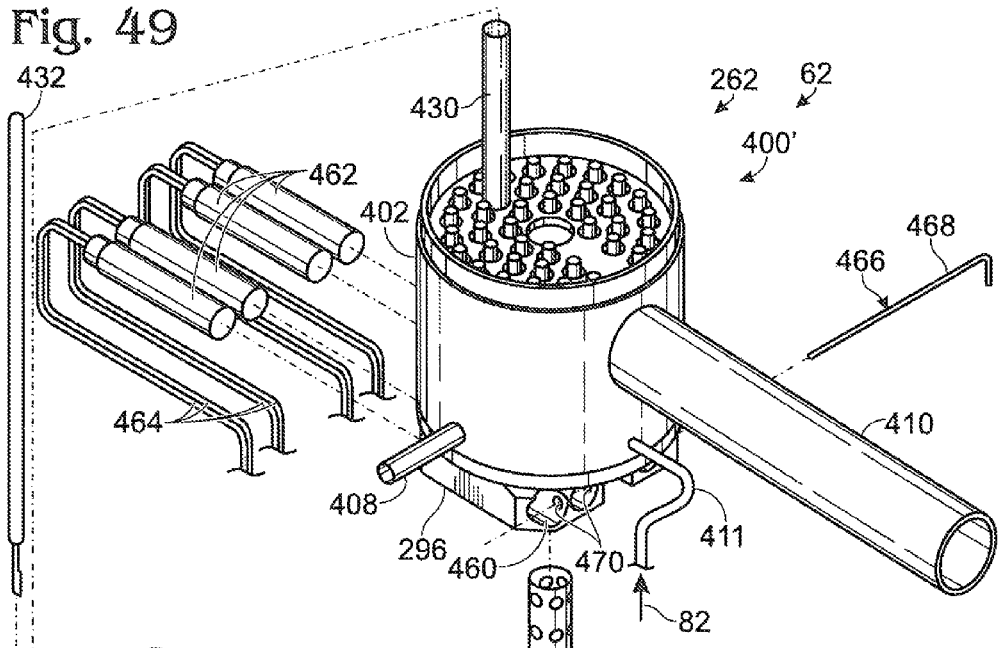
Fig. 49
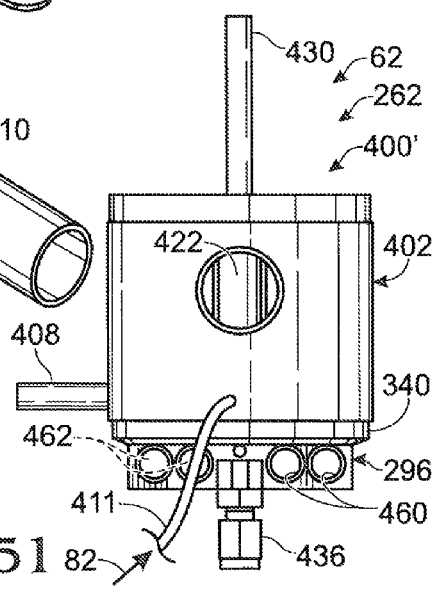
Fig. 50
Fig. 51

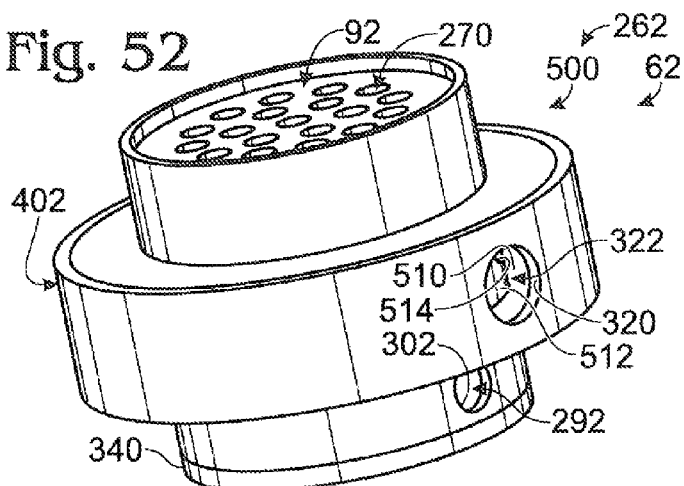
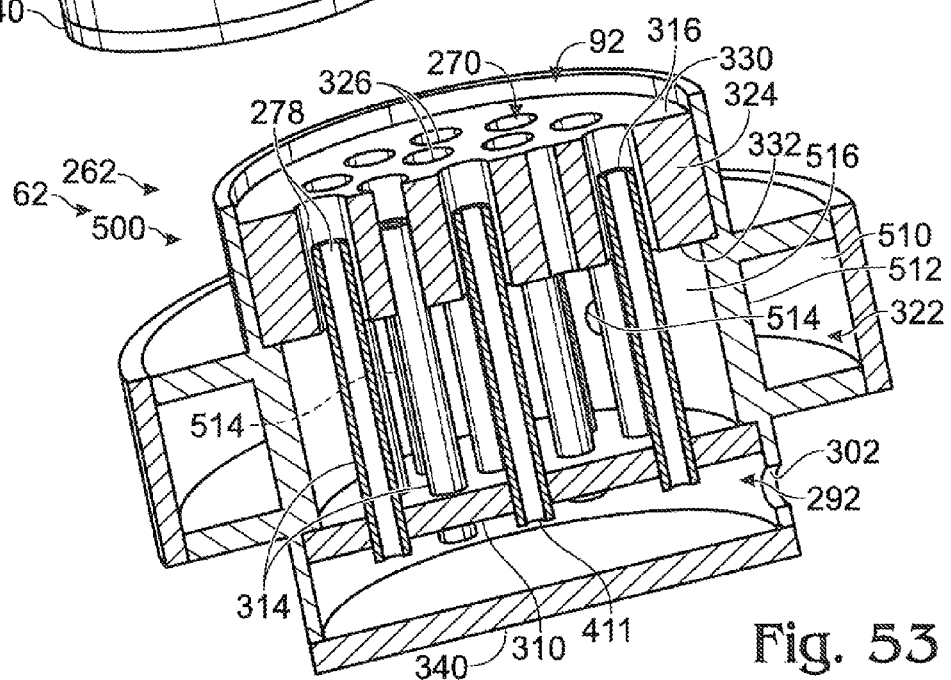
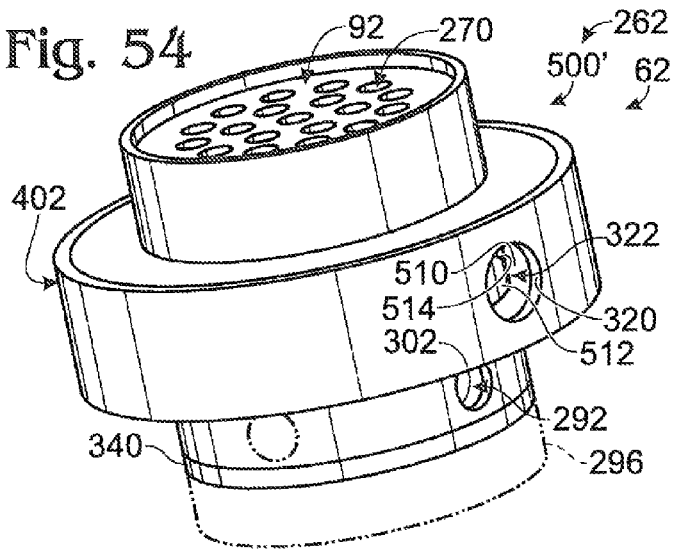

STEAM REFORMING FUEL PROCESSOR, BURNER ASSEMBLY, AND METHODS OF OPERATING THE SAME

RELATED APPLICATIONS

This application is a divisional continuing application of, and claims priority to, U.S. patent application Ser. No. 12/428,660, which was filed on Apr. 23, 2009, and which claims priority to U.S. patent application Ser. No. 10/412, 709, which was filed on Apr. 10, 2003 and which claims priority to U.S. Provisional Patent Application Ser. No. 60/372,748, which was filed on Apr. 14, 2002 and is entitled "Steam Reforming Fuel Processor, Burner Assembly, and Methods of Operating the Same," and to U.S. Provisional Patent Application Ser. No. 60/392,397, which was filed on Jun. 27, 2002 and is entitled "Fuel Processing System with Diffusion Burner Assembly." This application also claims priority to U.S. Pat. No. 7,828,864, which issued on Nov. 9, 2010 and which is also a divisional continuing application of U.S. Patent Application Serial No. 10/412,709. The complete disclosures of the above-identified applications are hereby incorporated by reference.

FIELD OF THE DISCLOSURE

The present disclosure is directed generally to fuel processing and fuel cell systems, and more particularly, to burner assemblies for use in such systems and to fuel processing and fuel cell systems containing these burner assemblies.

BACKGROUND OF THE DISCLOSURE

Purified hydrogen is used in the manufacture of many products including metals, edible fats and oils, and semiconductors and microelectronics. Purified hydrogen is also an important fuel source for many energy conversion devices. For example, many fuel cells use purified hydrogen and an oxidant to produce an electrical potential. A series of interconnected fuel cells is referred to as a fuel cell stack, and this stack may be referred to as a fuel cell system when combined with sources of oxidant and hydrogen gas. Various processes and devices may be used to produce the hydrogen gas that is consumed by the fuel cells.

As used herein, a fuel processor is a device that produces hydrogen gas from a feed stream that includes one or more feedstocks. Examples of fuel processors include steam and autothermal reformers, in which the feed stream contains water and a carbon-containing feedstock, such as an alcohol or a hydrocarbon, and partial oxidation and pyrolysis reactors, in which the feed stream is a carbon-containing feedstock. Fuel processors typically operate at elevated temperatures. Because the reforming and other fuel processing reactions are overall endothermic, the heat required to heat the fuel processors needs to be provided by a heating assembly, such as a burner, electrical heater or the like. When burners are used to heat the fuel processor, the burners typically utilize a combustible fuel stream, such as a combustible gas or a combustible liquid.

One such hydrogen-producing fuel processor is a steam reformer, in which hydrogen gas is produced from a feed stream that includes a carbon-containing feedstock and water. Steam reforming is performed at elevated temperatures and pressures, and therefore steam reformers typically include a heating assembly that provides heat for the steam reforming reaction, such as to maintain the reforming catalyst bed at a selected reforming temperature and to vaporize the feed stream. One type of heating assembly is a burner, in which a combustible fuel stream is combusted with air. Steam reformers conventionally utilize a feed stream that is vaporized and reformed to produce a mixed gas stream containing hydrogen gas and other gases, and a fuel stream that has a different composition that the feed stream and which is delivered to, and consumed by, the burner or other heating assembly to heat the steam reformer.

SUMMARY OF THE DISCLOSURE

The present disclosure is directed to a burner assembly, such as may be used in fuel processing and fuel cell systems, and to fuel processing and fuel cell systems containing burner assemblies according to the present disclosure. The burner assembly receives at least one fuel stream, mixes the stream with air and ignites the mixed stream to provide heat for a fuel processor. In some embodiments, the burner assembly is adapted to receive and vaporize a liquid combustible fuel stream, in other embodiments, the burner assembly is adapted to receive a gaseous combustible fuel stream, and in still other embodiments, the burner assembly is adapted to receive both liquid and gaseous combustible fuel streams. In some embodiments, the burner assembly receives at least one combustible fuel stream that is produced by the fuel processing and/or fuel cell system with which the burner is used. In some embodiments, the burner assembly receives a fuel stream having the same composition as a stream that is delivered for non-combustion purposes to another portion of the fuel processing and/or fuel cell system with which the burner assembly is used. In some embodiments, the burner assembly is adapted to receive and vaporize a fuel stream that includes the same carbon-containing feedstock and/or the same overall composition as the feed stream from which the steam reformer or other fuel processor produces hydrogen gas. In some embodiments, the feed stream and the fuel stream have the same composition, and optionally are selectively delivered from the same supply. In some embodiments, the burner assembly is a diffusion burner assembly. In some embodiments, the burner assembly is an atomizing burner assembly. Methods for operating a steam reformer and burner assembly are also disclosed herein.

BRIEF DESCRIPTION OF THE DRAWINGS

FIG. 16 is a schematic view of an ignition region of a burner assembly that includes an atomization assembly that includes an impingement member that atomizes the feed stream.

FIG. 17 is a schematic view of another ignition region of a burner assembly that includes an impingement member that atomizes the feed stream.

FIG. 18 is a schematic view of another ignition region of a burner assembly according to the present disclosure that includes an impingement member that atomizes the feed stream.

FIG. 19 is a cross-sectional view of an ignition region of another burner assembly that includes an impingement member.

FIG. 20 is a cross-sectional view of the region of FIG. 19 taken along the line 20-20 in FIG. 19.

FIG. 21 is a cross-sectional view of another ignition region of a burner assembly according to the present disclosure that also combusts a byproduct stream from the fuel processor.

FIG. 22 is a cross-sectional view of the region of FIG. 21, taken along the line 22-22 in FIG. 21.

FIG. 23 is a cross-sectional view of another ignition region of a burner assembly according to the present disclosure.

FIG. 24 is a top plan view of the ignition region of FIG. 23 taken along the line 24-24 in FIG. 23.

FIG. 25 is a cross-sectional view of a portion of the distribution plate of the ignition region of FIG. 23 taken along the line 25-25 in FIG. 24.

FIG. 26 is a cross-sectional view of a variation of the ignition regions of FIGS. 20 and 22 that includes an extension sleeve with a reduced-area outlet.

FIG. 27 is a top plan view of extension sleeve of the ignition region of FIG. 26.

FIG. 28 is a cross-sectional view showing another variation of the ignition regions of FIGS. 23 and 26.

FIG. 29 is an exploded cross-sectional view of the ignition region of FIG. 28.

FIG. 33 is an isometric view of another fuel processor with a burner assembly according to the present disclosure.

FIG. 34 is an exploded isometric view of the fuel processor of FIG. 34.

FIG. 35 is a side elevation view of the fuel processor of FIGS. 33 and 34 with the shroud, or cover assembly, removed.

FIG. 40 is a schematic diagram of another burner assembly according to the present disclosure.

FIG. 41 is a schematic diagram of another burner assembly according to the present disclosure.

FIG. 42 is a schematic diagram of another burner assembly according to the present disclosure.

FIG. 49 is an isometric view of a variation of the burner assembly of FIGS. 45 and 47.

FIG. 50 is an isometric view of the burner assembly of FIG. 49 with an installed heating assembly.

FIG. 51 is an exploded isometric view of the burner assembly of FIG. 50.

FIG. 52 is an isometric view of another burner assembly according to the present disclosure.

FIG. 53 is a cross-sectional isometric view of the burner assembly of FIG. 52.

FIG. 54 is a cross-sectional isometric view showing a variation of the burner assembly of FIG. 53.

DETAILED DESCRIPTION AND BEST MODE OF THE DISCLOSURE

Figure 1:
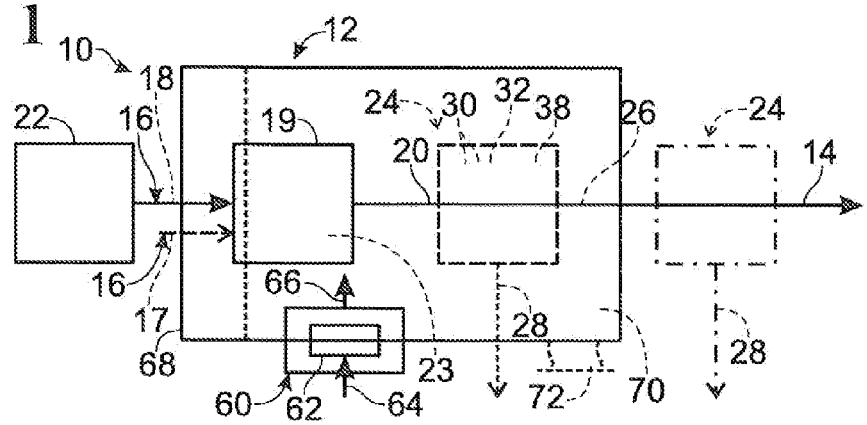
FIG. 1 is a schematic diagram of a fuel processing system with a burner assembly according to the present disclosure.

A fuel processing system is shown in FIG. 1 and indicated generally at 10. System 10 includes a fuel processor 12 that is adapted to produce a product hydrogen stream 14 containing hydrogen gas, and preferably at least substantially pure hydrogen gas, from one or more feed streams 16. Fuel processor 12 is any suitable device, or combination of devices, that is adapted to produce hydrogen gas from feed stream(s) 16. Accordingly, processor 12 includes a hydrogen-producing region 19, in which a resultant stream 20 containing hydrogen gas is produced by utilizing any suitable hydrogen-producing mechanism(s). By this it is meant that hydrogen gas is at least a primary constituent of stream 20.

Examples of suitable mechanisms for producing hydrogen gas from feed stream(s) 16 include steam reforming and autothermal reforming, in which reforming catalysts are used to produce hydrogen gas from a feed stream containing a carbon-containing feedstock and water. Other suitable mechanisms for producing hydrogen gas include pyrolysis and catalytic partial oxidation of a carbon-containing feedstock, in which case the feed stream does not contain water. Still another suitable mechanism for producing hydrogen gas is electrolysis, in which case the feedstock is water. Examples of suitable carbon-containing feedstocks include at least one hydrocarbon or alcohol. Examples of suitable hydrocarbons include methane, propane, natural gas, diesel, kerosene, gasoline and the like. Examples of suitable alcohols include methanol, ethanol, and polyols, such as ethylene glycol and propylene glycol.

Feed stream(s) 16 may be delivered to fuel processor 12 via any suitable mechanism. While a single feed stream 16 is shown in FIG. 1, it is within the scope of the disclosure that more than one stream 16 may be used and that these streams may contain the same or different feedstocks. This is schematically illustrated by the inclusion of a second feed stream 16 in dashed lines in FIG. 1. When feed stream 16 contains two or more components, such as a carbon-containing feedstock and water, the components may be delivered in the same or different feed streams. For example, when the fuel processor is adapted to produce hydrogen gas from a carbon-containing feedstock and water, these components are typically delivered in separate streams when they are not miscible with each other. This is schematically illustrated in dashed lines in FIG. 1, in which reference numeral 17 represents water and reference numeral 18 represents a carbon-containing feedstock, such as many hydrocarbons, that is not miscible with water. When the carbon-containing feedstock is miscible with water, the feedstock is typically, but not required to be, delivered with the water component of feed stream 16, such as shown in the subsequently described FIG. 2. For example, when the fuel processor receives a feed stream containing water and a water-soluble alcohol, such as methanol, these components may be premixed and delivered as a single stream.

In FIG. 1, feed stream 16 is shown being delivered to fuel processor 12 by a feedstock delivery system 22, which schematically represents any suitable mechanism, device or combination thereof for selectively delivering the feed stream to the fuel processor. For example, the delivery system may include one or more pumps that deliver the components of stream 16 from one or more supplies. Additionally, or alternatively, system 22 may include a valve assembly adapted to regulate the flow of the components from a pressurized supply. The supplies may be located external of the fuel processing system, or may be contained within or adjacent the system. When feed stream 16 is delivered to the fuel processor in more than one stream, the streams may be delivered by the same or separate feed stream delivery systems.

An example of a hydrogen-producing mechanism in which feed stream 16 comprises water and a carbon-containing feedstock is steam reforming. In a steam reforming process, hydrogen-producing region 19 contains a reforming catalyst 23, as indicated in dashed lines in FIGS. 1 and 2. In such an embodiment, the fuel processor may be referred to as a steam reformer, hydrogen-producing region 19 may be referred to as a reforming region, and resultant, or mixed gas, stream 20 may be referred to as a reformate stream. Examples of suitable steam reforming catalysts include copper-zinc formulations of low temperature shift catalysts and a chromium formulation sold under the trade name KMA by Süd-Chemie, although others may be used. The other gases that are typically present in the reformate stream include carbon monoxide, carbon dioxide, methane, steam and/or unreacted carbon-containing feedstock.

Steam reformers typically operate at temperatures in the range of 200° C. and 700° C., and at pressures in the range of 50 psi and 300 psi, although temperatures and pressures outside of this range are within the scope of the invention. When the carbon-containing feedstock is an alcohol, the steam reforming reaction will typically operate in a temperature range of approximately 200-500° C., and when the carbon-containing feedstock is a hydrocarbon, a temperature range of approximately 400-800° C. will be used for the steam reforming reaction. As such, feed stream 16 is typically delivered to the fuel processor at a selected pressure, such as a pressure within the illustrative range presented above.

In many applications, it is desirable for the fuel processor to produce at least substantially pure hydrogen gas. Accordingly, the fuel processor may utilize a process that inherently produces sufficiently pure hydrogen gas. When the resultant stream contains sufficiently pure hydrogen gas and/or sufficiently low concentrations of one or more non-hydrogen components for a particular application, product hydrogen stream 14 may be formed directly from resultant stream 20. However, in many hydrogen-producing processes, resultant stream 20 will be a mixed gas stream that contains hydrogen gas and other gases. Similarly, in many applications, the product hydrogen stream may be substantially pure but still contain concentrations of one or more non-hydrogen components that are harmful or otherwise undesired for the application for which the product hydrogen stream is intended to be used.

Accordingly, fuel processing system 10 may (but is not required to) further include a separation region 24, in which the resultant, or mixed gas, stream is separated into a hydrogen-rich stream 26 and at least one byproduct stream 28. Hydrogen-rich stream 26 contains at least one of a greater hydrogen purity than the resultant stream and a reduced concentration of one or more of the other gases or impurities that were present in the resultant stream. Separation region 24 is schematically illustrated in FIG. 1, where resultant stream 20 is shown being delivered to an optional separation region 24. As shown in FIG. 1, product hydrogen stream 14 is formed from hydrogen-rich stream 26. Byproduct stream 28 may be exhausted, sent to a burner assembly or other combustion source, used as a heated fluid stream, stored for later use, or otherwise utilized, stored or disposed of. It is within the scope of the disclosure that byproduct stream 28 may be emitted from the separation region as a continuous stream responsive to the delivery of resultant stream 20 to the separation region, or intermittently, such as in a batch process or when the removed portion of the resultant stream is retained at least temporarily in the separation region.

Separation region 24 includes any suitable device, or combination of devices, that are adapted to reduce the concentration of at least one component of resultant stream 20. In most applications, hydrogen-rich stream 26 will have a greater hydrogen purity than resultant stream 20. However, it is also within the scope of the disclosure that the hydrogen-rich stream will have a reduced concentration of one or more non-hydrogen components that were present in resultant stream 20, yet have the same, or even a reduced overall hydrogen purity as the resultant stream. For example, in some applications where product hydrogen stream 14 may be used, certain impurities, or non-hydrogen components, are more harmful than others. As a specific example, in conventional fuel cell systems, carbon monoxide may damage a fuel cell stack if it is present in even a few parts per million, while other possible non-hydrogen components, such as water, will not damage the stack even if present in much greater concentrations. Therefore, in such an application, a suitable separation region may not increase the overall hydrogen purity, but it will reduce the concentration of a non-hydrogen component that is harmful, or potentially harmful, to the desired application for the product hydrogen stream.

Illustrative examples of suitable devices for separation region 24 include one or more hydrogen-selective membranes 30, chemical carbon monoxide removal assemblies 32, and pressure swing adsorption systems 38. It is within the scope of the disclosure that separation region 24 may include more than one type of separation device, and that these devices may have the same or different structures and/or operate by the same or different mechanisms.

Hydrogen-selective membranes 30 are permeable to hydrogen gas, but are largely impermeable to other components of resultant stream 20. Membranes 30 may be formed of any hydrogen-permeable material suitable for use in the operating environment and parameters in which separation region 24 is operated. Examples of suitable materials for membranes 30 include palladium and palladium alloys, and especially thin films of such metals and metal alloys. Palladium alloys have proven particularly effective, especially palladium with 35 wt % to 45 wt % copper. A palladium-copper alloy that contains approximately 40 wt % copper has proven particularly effective, although other relative concentrations and components may be used within the scope of the invention.

Hydrogen-selective membranes are typically formed from a thin foil that is approximately 0.001 inches thick. It is within the scope of the present invention, however, that the membranes may be formed from other hydrogen-permeable and/or hydrogen-selective materials, including metals and metal alloys other than those discussed above as well as non-metallic materials and compositions, and that the membranes may have thicknesses that are greater or less than discussed above. For example, the membrane may be made thinner, with commensurate increase in hydrogen flux. Examples of suitable mechanisms for reducing the thickness of the membranes include rolling, sputtering and etching. A suitable etching process is disclosed in U.S. Pat. No. 6,152,995, the complete disclosure of which is hereby incorporated by reference for all purposes. Examples of various membranes, membrane configurations, and methods for preparing the same are disclosed in U.S. Pat. Nos. 6,221,117, 6,319,306, and 6,537,352, the complete disclosures of which are hereby incorporated by reference for all purposes.

Figure 2:
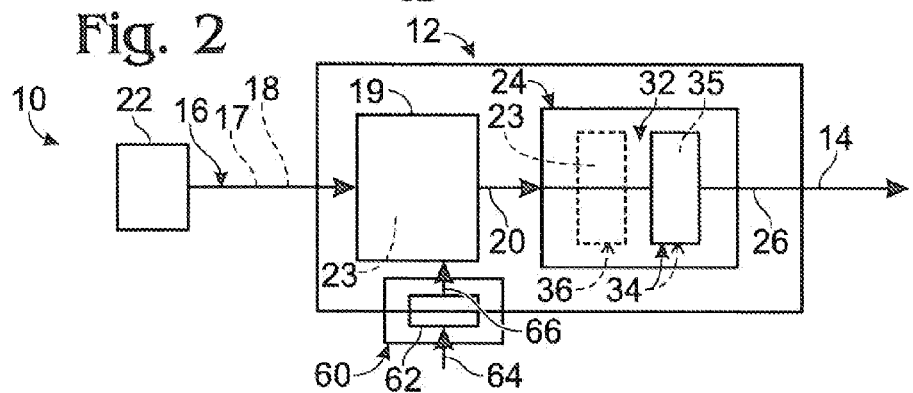
FIG. 2 is a schematic diagram of a fuel processing system with a chemical carbon monoxide removal assembly according to the present disclosure.

Chemical carbon monoxide removal assemblies 32 are devices that chemically react carbon monoxide, if present in resultant stream 20, to form other compositions that are not as potentially harmful as carbon monoxide. Examples of chemical carbon monoxide removal assemblies include water-gas shift reactors and other devices that convert carbon monoxide to carbon dioxide, and methanation catalyst beds that convert carbon monoxide and hydrogen to methane and water. It is within the scope of the disclosure that fuel processing system 10 may include more than one type and/or number of chemical removal assemblies 32. FIG. 2 provides a graphical depiction of a fuel processing system that includes a separation region 24 with a chemical removal assembly 32. In the illustrated example, assembly 32 includes a methanation region 34 that includes a methanation catalyst 35. Methanation catalyst 35 converts carbon monoxide and carbon dioxide into methane and water, both of which will not damage a PEM fuel cell stack. Accordingly, region 34 may be referred to as including at least one methanation catalyst bed. Separation region 32 may also include a reforming region 36 that contains reforming catalyst 23 to convert any unreacted feedstock into hydrogen gas. In such an embodiment, it is preferable that the reforming catalyst is upstream from the methanation catalyst so as not to reintroduce carbon dioxide or carbon monoxide downstream of the methanation catalyst. When used to treat the hydrogen-rich stream from one or more hydrogen-selective membranes, reforming region 36 may be described as being a secondary, or polishing, reforming region, and it may also be described as being downstream from the primary reforming region and/or the hydrogen selective membrane(s).

Pressure swing adsorption (PSA) is a chemical process in which gaseous impurities are removed from resultant stream 20 based on the principle that certain gases, under the proper conditions of temperature and pressure, will be adsorbed onto an adsorbent material more strongly than other gases. Typically, it is the impurities that are adsorbed and thus removed from resultant stream 20. The success of using PSA for hydrogen purification is due to the relatively strong adsorption of common impurity gases (such as CO, $CO_2$, hydrocarbons including $CH_4$, and $N_2$) on the adsorbent material. Hydrogen adsorbs only very weakly and so hydrogen passes through the adsorbent bed while the impurities are retained on the adsorbent material. Impurity gases such as $NH_3$, $H_2S$, and $H_2O$ adsorb very strongly on the adsorbent material and are therefore removed from stream 20 along with other impurities. Impurity gases such as $NH_3$, $H_2S$, and $H_2O$ adsorb very strongly on the adsorbent material and are therefore removed from stream 20 along with other impurities. If the adsorbent material is going to be regenerated and these impurities are present in stream 20, separation region 24 preferably includes a suitable device that is adapted to remove these impurities prior to delivery of stream 20 to the adsorbent material because it is more difficult to desorb these impurities.

Adsorption of impurity gases occurs at elevated pressure. When the pressure is reduced, the impurities are desorbed from the adsorbent material, thus regenerating the adsorbent material. Typically, PSA is a cyclic process and requires at least two beds for continuous (as opposed to batch) operation. Examples of suitable adsorbent materials that may be used in adsorbent beds are activated carbon and zeolites, especially 5 Å (5 angstrom) zeolites. The adsorbent material is commonly in the form of pellets and it is placed in a cylindrical pressure vessel utilizing a conventional packed-bed configuration. It should be understood, however, that other suitable adsorbent material compositions, forms and configurations may be used.

PSA system 38 also provides an example of a device for use in separation region 24 in which the byproducts, or removed components, are not directly exhausted from the region as a gas stream concurrently with the separation of the resultant stream. Instead, these components are removed when the adsorbent material is regenerated or otherwise removed from the separation region.

In FIG. 1, separation region 24 is shown within fuel processor 12. It is within the scope of the disclosure that region 24, when present, may alternatively be separately located downstream from the fuel processor, as is schematically illustrated in dash-dot lines in FIG. 1. It is also within the scope of the disclosure that separation region 24 may include portions within and external fuel processor 12.

In the context of a fuel processor that is adapted to produce a product hydrogen stream that will be used as a feed, or fuel, stream for a fuel cell stack, the fuel processor preferably is adapted to produce substantially pure hydrogen gas, and even more preferably, the fuel processor is adapted to produce pure hydrogen gas. For the purposes of the present disclosure, substantially pure hydrogen gas is greater than 90% pure, preferably greater than 95% pure, more preferably greater than 99% pure, and even more preferably greater than 99.5% pure. Suitable fuel processors for producing streams of at least substantially pure hydrogen gas are disclosed in U.S. Pat. Nos. 6,319,306, 6,221,117, 5,997,594, 5,861,137, pending U.S. patent application Ser. No. 09/802,361, which was filed on Mar. 8, 2001 and is entitled "Fuel Processor and Systems and Devices Containing the Same," and U.S. patent application Ser. No. 10/407,500, which was filed on Apr. 4, 2003, is entitled "Steam Reforming Fuel Processor," and which claims priority to U.S. Provisional Patent Application Ser. No. 60/372,258. The complete disclosures of the above-identified patents and patent applications are hereby incorporated by reference for all purposes.

Figure 3:
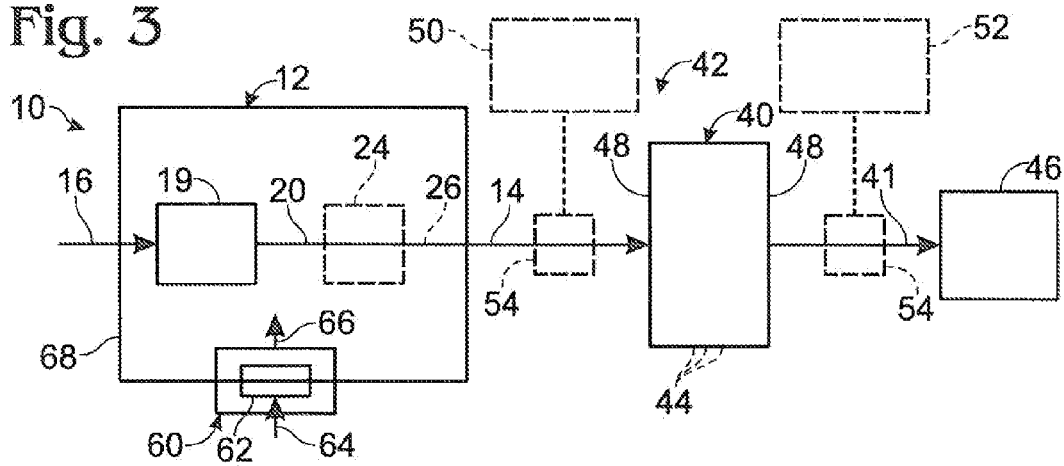
FIG. 3 is a schematic diagram of a fuel cell system with a burner assembly according to the present disclosure.

Product hydrogen stream 14 may be used in a variety of applications, including applications where high purity hydrogen gas is utilized. An example of such an application is as a fuel, or feed, stream for a fuel cell stack. A fuel cell stack is a device that produces an electrical potential from a source of protons, such as hydrogen gas, and an oxidant, such as oxygen gas. Accordingly, a fuel cell stack may be adapted to receive at least a portion of product hydrogen stream 14 and a stream of oxygen (which is typically delivered as an air stream), and to produce an electric current therefrom. This is schematically illustrated in FIG. 3, in which a fuel cell stack is indicated at 40 and produces an electric current, which is schematically illustrated at 41. In such a configuration, in which the fuel processor or fuel processing system is coupled to a fuel cell stack, the resulting system may be referred to as a fuel cell system 42 because it includes a fuel cell stack and a source of fuel for the fuel cell stack. It is within the scope of the present disclosure that fuel processors and burner assemblies according to the present disclosure may be used in applications that do not include a fuel cell stack.

When stream 14 is intended for use in a fuel cell stack, compositions that may damage the fuel cell stack, such as carbon monoxide and carbon dioxide, may be removed from the hydrogen-rich stream, if necessary, such as by separation region 24. For fuel cell stacks, such as proton exchange membrane (PEM) and alkaline fuel cell stacks, the concentration of carbon monoxide is preferably less than 10 ppm (parts per million). Preferably, the concentration of carbon monoxide is less than 5 ppm, and even more preferably, less than 1 ppm. The concentration of carbon dioxide may be greater than that of carbon monoxide. For example, concentrations of less than 25% carbon dioxide may be acceptable. Preferably, the concentration is less than 10%, and even more preferably, less than 1%. Especially preferred concentrations are less than 50 ppm. It should be understood that the acceptable minimum concentrations presented herein are illustrative examples, and that concentrations other than those presented herein may be used and are within the scope of the present invention. For example, particular users or manufacturers may require minimum or maximum concentration levels or ranges that are different than those identified herein.

Fuel cell stack 40 contains at least one, and typically multiple, fuel cells 44 that are adapted to produce an electric current from the portion of the product hydrogen stream 14 delivered thereto. A fuel cell stack typically includes multiple fuel cells joined together between common end plates 48, which contain fluid delivery/removal conduits. Examples of suitable fuel cells include proton exchange membrane (PEM) fuel cells and alkaline fuel cells. Others include solid oxide fuel cells, phosphoric acid fuel cells, and molten carbonate fuel cells.

The electric current produced by stack 40 may be used to satisfy the energy demands, or applied load, of at least one associated energy-consuming device 46. Illustrative examples of devices 46 include, but should not be limited to motor vehicles, recreational vehicles, construction or industrial vehicles, boats or other seacraft, tools, lights or lighting assemblies, appliances (such as household or other appliances), households or other dwellings, offices or other commercial establishments, computers, signaling or communication equipment, etc. Similarly, stack 40 may be used to satisfy the power requirements of fuel cell system 42. It should be understood that device 46 is schematically illustrated in FIG. 3 and is meant to represent one or more devices, or collection of devices, that are adapted to draw electric current from the fuel cell system.

Fuel cell stack 40 may receive all of product hydrogen stream 14. Some or all of stream 14 may additionally, or alternatively, be delivered, via a suitable conduit, for use in another hydrogen-consuming process, burned for fuel or heat, or stored for later use. As an illustrative example, a hydrogen storage device 50 is shown in dashed lines in FIG. 3. Device 50 is adapted to store at least a portion of product hydrogen stream 14. For example, when the demand for hydrogen gas by stack 40 is less than the hydrogen output of fuel processor 12, the excess hydrogen gas may be stored in device 50. Illustrative examples of suitable hydrogen storage devices include hydride beds and pressurized tanks. Although not required, a benefit of system 10 or 42 including a supply of stored hydrogen is that this supply may be used to satisfy the hydrogen requirements of stack 40, or the other application for which stream 14 is used, in situations when processor 12 is not able to meet these hydrogen demands. Examples of these situations include when the fuel processor is starting up from a cold, or inactive state, ramping up from an idle state, offline for maintenance or repair, and when the stack or application is demanding a greater flow rate of hydrogen gas than the maximum available production from the fuel processor. Additionally or alternatively, the stored hydrogen may also be used as a combustible fuel stream to heat the fuel processing or fuel cell system. Fuel processing systems that are not directly associated with a fuel cell stack may still include at least one hydrogen-storage device, thereby enabling the product hydrogen streams from these fuel processing systems to also be stored for later use.

Fuel cell system 42 may also include a battery 52 or other suitable electricity-storing device that is adapted to store electricity produced by stack 40. Similar to the above discussion regarding excess hydrogen, stack 40 may produce electricity in excess of that necessary to satisfy the load exerted, or applied, by device 46, including the load required to power system 42. In further similarity to the above discussion of excess hydrogen gas, this excess supply may be transported from the system for use in other applications and/or stored for later use by the system. For example, the battery or other storage device may provide power for use by system 42 during startup or other applications in which the system is not producing electricity and/or hydrogen gas. In FIG. 3, flow-regulating structures are generally indicated at 54 and schematically represent any suitable manifold, valves, controllers and the like for selectively delivering hydrogen and electricity to device 50 and battery 52, respectively, and to draw the stored hydrogen and electricity therefrom.

In FIG. 1, fuel processor 10 is shown including a shell 68 in which at least the hydrogen-producing region, and optionally the separation region, is contained. Shell 68, which also may be referred to as a housing, enables the components of the steam reformer or other fuel processor to be moved as a unit.

It also protects the components of the fuel processor from damage by providing a protective enclosure and reduces the heating demand of the fuel processor because the components of the fuel processor may be heated as a unit. Shell 68 may, but does not necessarily, include insulating material 70, such as a solid insulating material, blanket insulating material, and/or an air-filled cavity. It is within the scope of the invention, however, that the fuel processor may be formed without a housing or shell. When fuel processor 10 includes insulating material 70, the insulating material may be internal the shell, external the shell, or both. When the insulating material is external a shell containing the above-described reforming, separation and/or polishing regions, the steam reformer may further include an outer cover or jacket 72 external the insulation, as schematically illustrated in FIG. 1.

Figure 4:
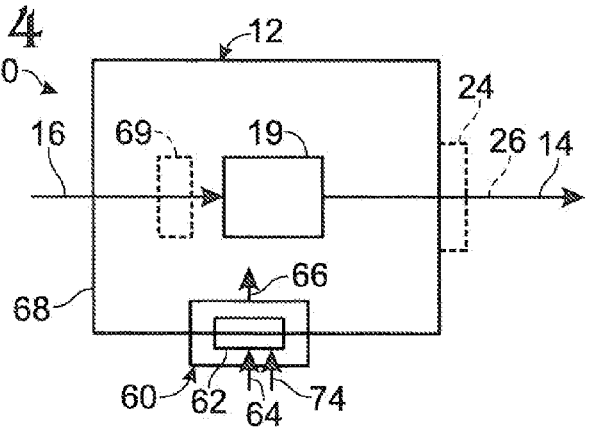
FIG. 4 is a schematic diagram of another fuel processor with a burner assembly according to the present disclosure.

It is further within the scope of the invention that one or more of the components of fuel processor 10 may either extend beyond the shell or be located external at least shell 68. For example, and as discussed, separation region 24 may be located external shell 68, such as with the separation being coupled directly to the shell (as schematically illustrated in FIG. 4) or being spaced-away from the shell but in fluid communication therewith by suitable fluid-transfer conduits (as indicated in dash-dot lines in FIG. 1). As another example, a portion of hydrogen-producing region 19 (such as portions of one or more reforming catalyst beds) may extend beyond the shell, such as indicated schematically with a dashed line in FIG. 1.

Fuel cell and fuel processing systems have been very schematically illustrated in FIGS. 1-4, and it should be understood that these systems often include additional components, such as air/oxidant supplies and delivery systems, heat exchange assemblies and/or sources, controllers, sensors, valves and other flow controllers, power management modules, etc. Similarly, although a single fuel processor 12 and/or a single fuel cell stack 40 are shown in various ones of FIGS. 1-4, it is within the scope of the disclosure that more than one of either or both of these components may be used.

As also shown in various ones of FIGS. 1-4, fuel processing (and fuel cell) systems according to the present disclosure include a heating assembly 60 that is adapted to heat at least the hydrogen-producing region 19 of the fuel processor. In systems according to the present disclosure, heating assembly 60 includes a burner assembly 62. Burner assembly 62 is adapted to receive at least one fuel stream 64 and to combust the fuel stream in the presence of air to provide a hot combustion stream 66 that may be used to heat at least the hydrogen-producing region 19 of the fuel processor. As discussed in more detail herein, air may be delivered to the burner assembly via a variety of mechanisms. In FIG. 4, an air stream 74 is shown in solid lines, with a dashed line being used to graphically indicate that it is within the scope of the disclosure for the air stream to additionally or alternatively be delivered to the burner assembly with at least one of the fuel streams 64 for the burner assembly. It is within the scope of the disclosure that combustion stream 66 may additionally or alternatively be used to heat other portions of the fuel processing and/or fuel cell systems with which burner assembly 62 is used. In FIGS. 1-4, burner assembly 62 is shown in an overlapping relationship with fuel processor 12 to graphically represent that it is within the scope of the disclosure that the burner assembly may be located partially or completely within the fuel processor, such as being at least partially within shell 68, and/or that at least a portion, or all, of the burner assembly may be located external the fuel processor.

In this latter embodiment, the hot combustion gases from the burner assembly will be delivered via suitable heat transfer conduits to the fuel processor or other portion of the systems to be heated.

As indicated in FIG. 4 in dashed lines, fuel processors 12 according to the present disclosure may include a vaporization region 69 that is adapted to receive a liquid feed stream 16 (or a liquid component of feed stream 16, such as a stream of water 17 or a stream of a liquid carbon-containing feedstock 76) and to vaporize the feed stream (or portion thereof) prior to delivery to the hydrogen-producing region of the fuel processor. As indicated schematically in FIG. 4, heated exhaust stream 66 from the heating assembly may be used to vaporize the feed stream in vaporization region 69 and/or otherwise heat the feed stream. It is within the scope of the disclosure that fuel processor 12 may be constructed without a vaporization region and/or that the fuel processor is adapted to receive a feed stream that is gaseous or that has already been vaporized.

Figure 5:
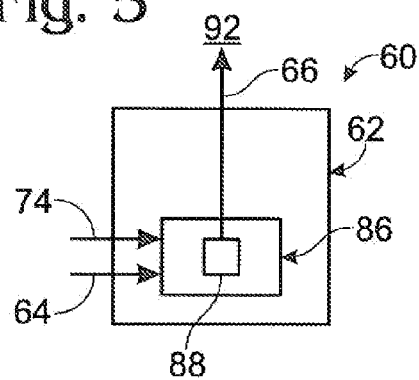
FIG. 5 is a schematic view of another burner assembly according to the present disclosure.

In FIG. 5, another illustrative heating assembly 60 with a burner assembly 62 is schematically illustrated. As shown, burner assembly 62 includes an ignition region 86 in which the fuel and air streams (64 and 74) are ignited to initiate the combustion thereof. Region 86 includes an ignition source 88, which is any suitable structure or device for igniting the fuel and air streams. Examples of suitable ignition sources 88 include at least one of a spark plug, a glow plug, a pilot light, a combustion catalyst, glow plugs in combination with combustion catalysts, electrically heated ceramic igniters, and the like. The streams are ignited and the combustion thereof produces a heated exhaust stream 66, which typically is exhausted from the ignition region to a combustion chamber 92 or other heat transfer region of the steam reformer or fuel processing system. It is within the scope of the disclosure that the combustion initiated in ignition region 86 may be completed in a variety of locations within the burner assembly and/or fuel processor being heated by the burner assembly. For example, the combustion may be fully completed in the ignition region, partially completed in the ignition region and partially completed in the combustion region, partially completed in the ignition region, the combustion region and a portion of the fuel processor external the combustion region, etc.

When fuel stream 64 is a gaseous stream, it can be mixed and ignited with air stream 74 to produce exhaust stream 66. However, some fuel streams 64 are liquid-phase fuel streams at the operating parameters at which the fuel stream is delivered to burner assembly 62, namely a temperature in the range of ambient (approximately 25° C.) to approximately 100° C. and a pressure in the range of 50-200 psi, and more typically 100-150 psi. It should be understood that the operating parameters discussed above are not intended to be exclusive examples. Instead, they are meant to illustrate typical parameters, with parameters outside of these ranges still being within the scope of the invention. For example, the fuel stream may be heated, through heat exchange or otherwise, before being delivered to the burner assembly, but this heating is not required, nor necessarily useful in many embodiments.

Figure 6:
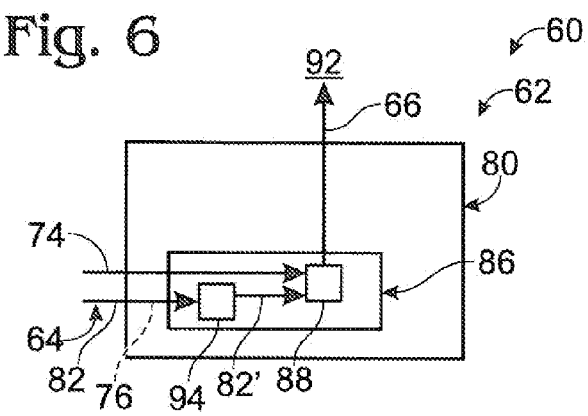
FIG. 6 is a schematic view of another burner assembly according to the present disclosure.

In the context of liquid-phase, or liquid, fuel streams, such as an alcohol like methanol or ethanol or a hydrocarbon like methane, ethane, gasoline, kerosene, diesel, etc., the burner assembly preferably includes an atomization assembly 94. This is illustrated graphically in FIG. 6, in which the liquid fuel stream is indicated at 82 and contains a liquid carbon-containing feedstock 76, and in which the burner assembly that is adapted to receive and atomize the liquid fuel stream is indicated at 80 and may be referred to as an atomizing burner assembly. As used herein, "liquid" is meant to refer to fuel streams that are at least 95% liquid-phase at the operating parameters at which the fuel stream is delivered to the burner assembly, and preferably at least approximately 99% liquid. It should be understood that even a "completely" liquid-phase stream may include a small (typically less than 1%) gas phase, such as produced by off gassing as the stream is heated. Atomization assembly 94 includes any suitable device or combination of devices that are adapted to convert liquid fuel stream 82 into an aerosol fuel stream 82' that can be mixed with air stream 74 and combusted, or ignited, to produce heated exhaust stream 66. This is contrasted with vaporizing burner assemblies that heat a liquid fuel stream until the fuel stream changes phases to a vapor phase. Illustrative examples of suitable atomization assemblies are discussed in more detail herein.

Figure 7:
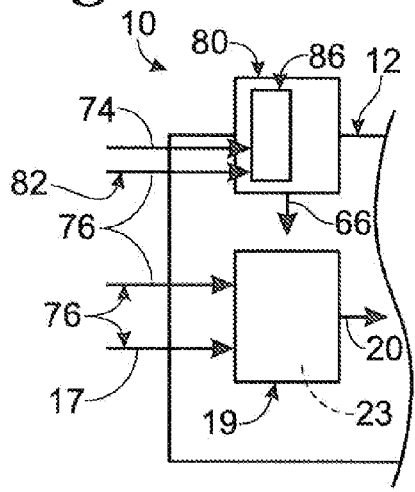
FIG. 7 is a schematic view of a fuel processor according to the present disclosure in which the hydrogen-producing region and the burner assembly both receive the same liquid carbon-containing feedstock.

As discussed, many conventional fuel processors, such as steam and autothermal reformers and pyrolysis and partial oxidation reactors, require a carbon-containing feedstock that is used in the hydrogen-producing reaction, and then a separate fuel stream that is used as a fuel source for the burner assembly. As such, these fuel processors require a separate source, pump or other delivery assembly, transport conduits and flow-regulating devices, etc. According to an aspect of the present disclosure, a liquid-phase carbon-containing feedstock 76 is used for both the carbon-containing feedstock portion of feed stream 16 and fuel stream 82 for burner assembly 80, such as schematically illustrated in FIG. 7. As shown, liquid carbon-containing feedstock 76 is delivered to both burner assembly 80 and hydrogen-producing region 19. FIG. 7 has been shown in fragmentary view because fuel processor 12 may have a wide variety of configurations, such as configurations that do not include a separation region, that utilize more than one type or number of separation mechanism, etc. It is intended that the fragmentary fuel processor shown in FIG. 7 (and subsequent Figures) schematically represents any of these configurations, as well as any of the steam reformers and other fuel processors described, illustrated and/or incorporated herein.

Figure 8:
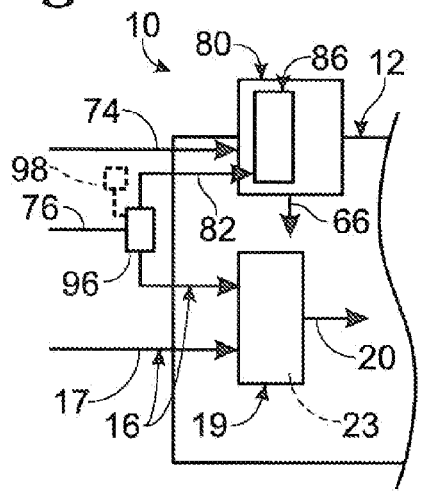
FIG. 8 is a schematic view showing a variation of the fuel processor of FIG. 7, with a carbon-containing feedstock being delivered to the hydrogen-producing region and the burner assembly from the same supply stream.

FIG. 8 is similar to FIG. 7, except that the liquid carbon-containing feedstock 76 is delivered as a single stream to valve assembly 96, in which the carbon-containing feedstock is selectively delivered to at least one of the burner assembly and the hydrogen-producing region. Valve assembly 96 may include any suitable structure for selectively dividing the stream of carbon-containing feedstock between the burner assembly and the hydrogen-producing region. The range of possible configurations includes the burner assembly receiving all of the carbon-containing feedstock, the hydrogen-producing region receiving all of the carbon-containing feedstock, or both the burner assembly and the hydrogen-producing region receiving carbon-containing feedstock. As discussed herein, the distribution of the carbon-containing feedstock depends at least in part upon the particular carbon-containing feedstock being used, whether byproduct stream 28 is also used as a fuel for burner assembly 80 and the particular mode of operation of the fuel processor, such as an idle mode, a startup mode, or a hydrogen-producing mode.

The distribution of feedstock 76 between the hydrogen-producing region and the burner assembly may be manually controlled. However, in many embodiments, it may be desirable for the distribution to be at least partially automated, such as by system 10 including a controller 98 that selectively regulates the delivery of feedstock 76 between the hydrogen-producing region and the burner assembly. An example of a suitable controller for a steam reforming fuel processor is disclosed in U.S. Pat. No. 6,383,670, the complete disclosure of which is hereby incorporated by reference.

Figure 9:
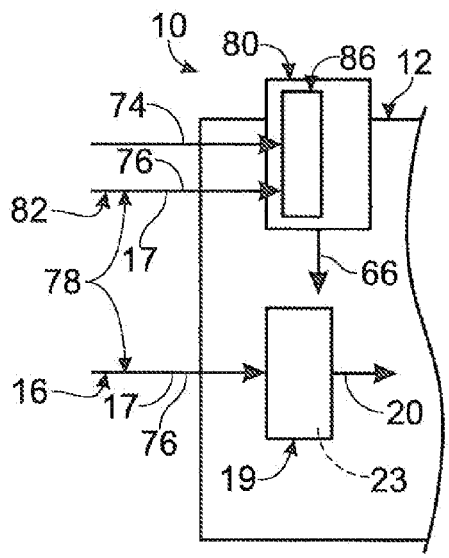
FIG. 9 is a schematic view of a fuel processor according to the present disclosure in which the hydrogen-producing region and the burner assembly both receive fuel, or feed, streams containing water and a liquid carbon-containing feedstock.
Figure 10:
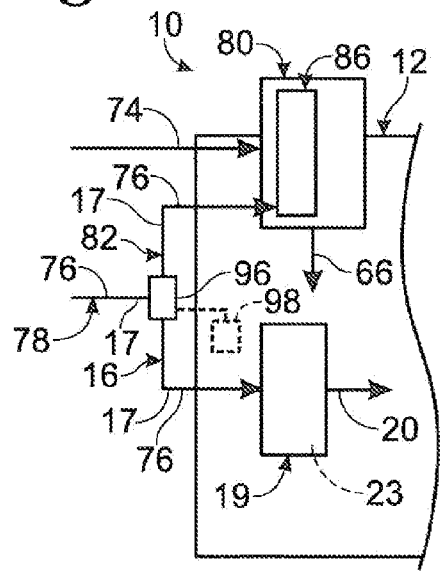
FIG. 10 is a schematic view showing a variation of the fuel processor of FIG. 9, with the hydrogen-producing region and the burner assembly both receiving fuel, or feed, streams containing water and a carbon-containing feedstock from the same supply stream.

Further reduction in the supplies, delivery systems, flow regulators, delivery conduits and the like may be achieved according to another aspect of the present disclosure by feed stream 16 and fuel stream 82 both containing the same liquid carbon-containing feedstock 76 and water 17, with the water forming at least approximately 25% of the stream and the carbon-containing feedstock preferably being miscible in water. This is schematically illustrated in FIGS. 9 and 10, in which this composite stream is indicated at 78. Streams 16 and 82 may have nearly, or completely, identical compositions, and may be entirely formed from stream 78. It is within the scope of the disclosure, however, that at least one of streams 16 and 82 may have at least one additional component or additional amount of water or carbon-containing feedstock added thereto prior to consumption of the stream by the burner assembly or hydrogen-producing region. As discussed previously, in the context of a steam reformer or other fuel processor that produces hydrogen gas from water and a carbon-containing feedstock, feed stream 16 is at least substantially, and typically essentially entirely, comprised of a mixture of water and a liquid-phase carbon-containing feedstock 76 that is preferably water-soluble. As such, a single stream containing water 17 and carbon-containing feedstock 76 can be consumed as both the hydrogen-producing feed stream 16, as well as the burner fuel stream 82.

Similar to the previously discussed alternatives of FIGS. 7 and 8 (where only the carbon-containing feedstock component of feed stream 16 was delivered to burner assembly 80), feed stream 78 may be selectively delivered to burner assembly 80 and hydrogen-producing region 19 in separate streams from the same or a different source. Alternatively, and as schematically illustrated in FIG. 10, a single feed stream 78 may be delivered to the fuel processor, and more specifically to a valve assembly 96, where the stream is selectively divided between the burner assembly and the hydrogen-producing region. A controller 98, which may be a computerized or other electronic controller or preprogrammed controller, is also shown in dashed lines in FIG. 10. Controller 98 may be located internal or external fuel processor 12, and/or may include both internal and external components.

The relative amounts of water 17 and liquid carbon-containing feedstock 76 in streams 16 and 78 may vary, and in part will depend upon the particular carbon-containing feedstock being used. The relative concentrations of these components may be expressed in terms of a ratio of water to carbon. When feedstock 76 is methanol, a 1:1 ratio has proven effective. When feedstock 76 is ethanol, a ratio of 2-3:1 has proven effective. When feedstock 76 is a hydrocarbon, a ratio of approximately 3:1 is typically used. However, the illustrative ratios described above are not meant to be exclusive ratios within the scope of the invention.

Figure 11:
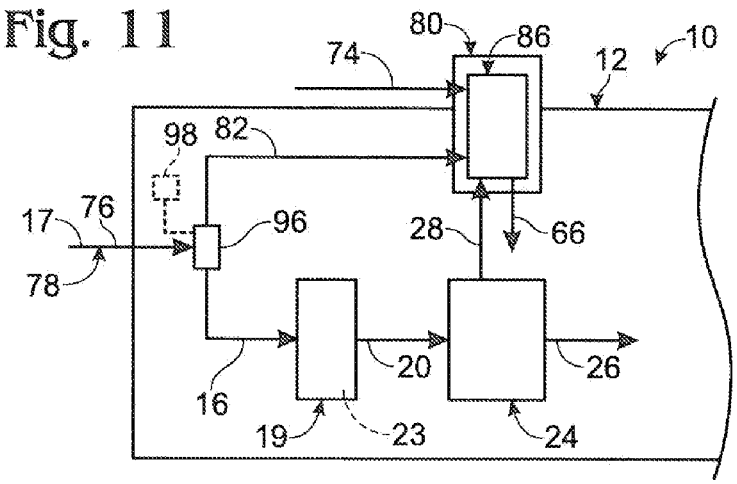
FIG. 11 is a schematic view showing another variation of the fuel processors of FIGS. 9 and 10.

In FIG. 11, a variation of the configuration of FIG. 10 is shown to illustrate that it is within the scope of the invention that the valve assembly may be located either internal or external fuel processor 10. FIG. 11 also illustrates that when the fuel processor includes or is otherwise associated with a separation region 24 that produces a gaseous byproduct stream 28, the gaseous byproduct stream 28 may be delivered to the burner assembly to be used as a gaseous fuel for the burner assembly. This gaseous fuel may supplement the liquid fuel discussed above (such as carbon-containing feedstock 76 or feed stream 16), or may itself contain sufficient heating value for certain steam reformers or other fuel processors and/or certain operating configurations of the fuel processors.

Figure 12:
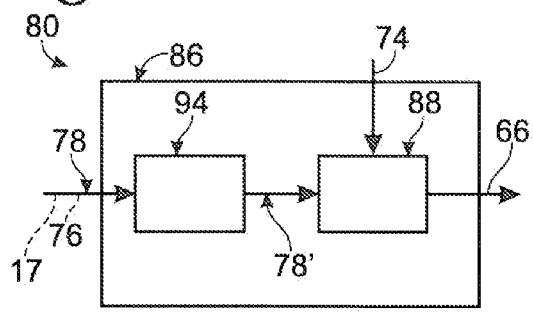
FIG. 12 is a schematic view showing another burner assembly according to the present disclosure.

As discussed above, in the context of burner assemblies 80 according to the present disclosure, the carbon-containing feedstock consumed in both the hydrogen-producing region and the burner assembly is a liquid at the operating parameters at which it is delivered to the burner assembly. As also discussed, burner assembly 80 includes an atomization assembly 94 that is adapted to atomize the liquid fuel stream (82) to produce a gaseous, or aerosol, stream (82') that is ignited in ignition region 86 with air stream 74. When the liquid fuel steam has the same composition as the feed stream for a steam reformer or other fuel processor that produces hydrogen gas from water and a carbon-containing feedstock, the liquid fuel stream therefore contains a substantial water component (typically at least 25%), the stream is a liquid stream, and atomization assembly 94 produces an aerosol, or gaseous, stream 78' therefrom, as schematically illustrated in FIG. 12. For the purpose of brevity, the following discussion of atomization assembly 94 will discuss a fuel stream in the form of a liquid stream 78 of water 17 and carbon-containing feedstock 76, with stream 78 having the same composition as the feed stream 16 for a steam reformer or other fuel processor that is adapted to produce from water and a carbon-containing feedstock a resultant stream 20 in which hydrogen gas is a primary component. However, it is within the scope of the present disclosure that the burner assemblies 80 and/or atomization assemblies 94 illustrated and/or described herein may also be used with a liquid carbon-containing feedstock without water, such as when the feedstock is a hydrocarbon that is not miscible in water. Similarly, and as discussed previously, it is also within the scope of the disclosure that stream 78 may be used to form the feed/fuel streams for both the fuel processor and the burner assembly, but at least one of these streams may have at least one additional component or additional amount of water or carbon-containing feedstock added thereto.

An illustrative example of a suitable structure for atomization assembly 94 is shown in FIG. 12 and includes an orifice 100 to which feed stream 78 is delivered under pressure, such as at a pressure in the range of 50-200 psi, and more typically approximately 100-150 psi. Orifice 100 is sized to reduce the liquid feed stream into an aerosol, or gaseous, stream 78' having sufficiently small droplets that the stream will tend to mix and disperse with air stream 74 instead of condensing or pooling in the burner assembly. The particular orifice size to be used in a particular application will tend to vary with the composition of the feed stream (or stream of carbon-containing feedstock), the flow rate of the stream, and the delivery pressure of the stream. As an illustrative example, for a feed stream containing methanol and water in the above-discussed mix ratio flowing at a feed rate of 15-20 mL/min and a pressure in the preferred range presented above, an orifice 100 having an opening in the range of 0.001-0.015 inches, and more preferably 0.006-0.007 inches, in diameter has proven effective.

Figure 13:
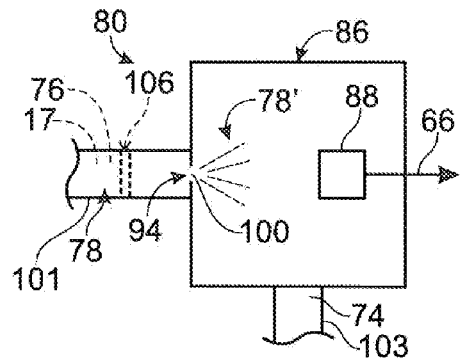
FIG. 13 is a schematic view showing an ignition region of a burner assembly that includes an atomization assembly that includes an atomizing orifice.
Figure 14:
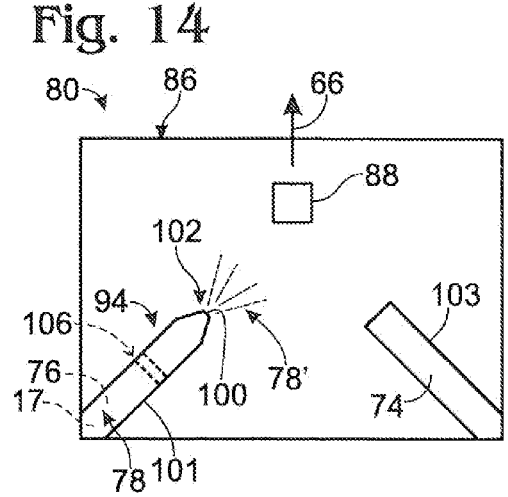
FIG. 14 is a schematic view of an ignition region of a burner assembly that includes an atomization assembly that includes a nozzle with an atomizing orifice.

In FIG. 13, orifice 100 is illustrated schematically as forming part of the boundary of ignition region 86 through which stream 78 must pass before reaching ignition source 88. Another example of a suitable configuration for orifice 100 is a nozzle 102 that optionally extends into region 86 and includes orifice 100, such as shown in FIG. 14. Regardless of the configuration or placement of orifice 100, it is preferable that the orifice be preceded with a filter 106, as schematically illustrated in FIGS. 13 and 14. Filter 106 is sized to remove from stream 78 particulate that is large enough to clog orifice 100. Filter 106 may be located at any suitable location upstream from orifice 100.

FIGS. 13 and 14 also demonstrate that it may be preferable for the atomized feed stream 78' and air 74 to be introduced into ignition region 86 at generally intersecting orientations to promote mixing of the streams as, or prior to, the streams being ignited by ignition source 88. The amount of heat provided by feed stream 78 will increase as the percentage of the feed stream that is fully combusted increases. One mechanism for increasing this value is to orient the streams or otherwise include structure within the burner assembly that promotes turbulence, and thus mixing, of the gas streams.

Figure 15:
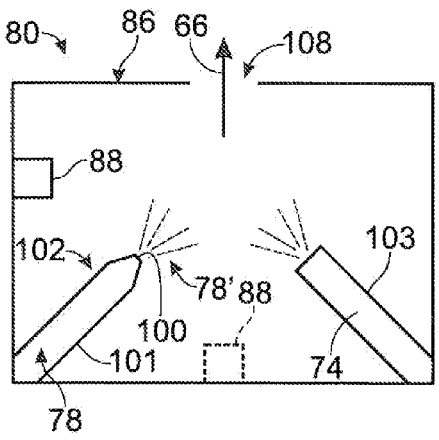
FIG. 15 is a schematic view of another ignition region of a burner assembly that includes an atomization assembly that includes a nozzle with an atomizing orifice.

In FIG. 14, ignition source 88 is located near the point of intersection of atomized feed stream 78' and air stream 74. While effective for igniting the streams, for at least some ignition sources, it may be desirable for the ignition source to be positioned within assembly 80 so that it is not in the direct, or at least primary, combustion (flame) region. An example of such a configuration is shown schematically in FIG. 15, in which ignition source 88 is located away from the region at which the streams intersect. Another example of such a position is shown in dashed lines in FIG. 15. Because these illustrative configurations locate the ignition source away from a position where they will be in the direct flame as the streams are burned, the ignition source will not be exposed to as high of temperatures as if the source was located in a region of direct flame. FIG. 15 also graphically illustrates that ignition region 86 may have an outlet 108 for heated exhaust stream 66 that has a smaller cross-sectional area than the ignition region. Expressed in other terms, the ignition region may promote greater mixing and combustion of the atomized feed stream and the air stream by restricting the size of the outlet through which the gases may exit the ignition region after combustion has been initiated.

As somewhat schematically illustrated in at least FIGS. 13-15, the fuel and air streams are introduced into the ignition region via input ports, or delivery conduits, which are indicated at 101 and 103, respectively. The illustrative examples of the delivery conduits demonstrate graphically that the conduits include at least one opening or orifice through which the fluid contained therein is released into the ignition region, with the conduits terminating at the boundary of the ignition region, or optionally, extending into the ignition region. It is within the scope of the disclosure that any suitable delivery conduits may be used, and that burner assemblies 80 according to the present disclosure may include more than one of conduits 101 and 103, with the burner assemblies thereby being adapted to receive and combust more than one fuel and/or air stream.

Another example of a suitable atomization assembly 94 is an impingement member 110, as schematically illustrated in FIG. 16. In such an embodiment, stream 78 is delivered under pressure into the ignition region such that the pressurized liquid stream strikes the impingement member 110, where it is atomized and produces an aerosol stream 78' as it ricochets from the surface. In FIG. 16, member 110 has a contact surface 112 that extends generally transverse the direction of flow of stream 78. However, it should be understood that it is within the scope of the invention that member 110 may have other configurations relative to the feed stream. FIG. 16 also graphically illustrates that the ignition region may include one or more baffles or other suitable turbulent-promoting structures 114.

Other examples are shown in FIG. 17 and include an impingement member 110 with a contact surface 116 that extends at an angle in the range of 15-75° relative to the direction at which feed steam 78 flows into contact with the surface. At 118, an example of a non-planar contact surface for impingement member 110 is shown.

Surface 118 tends to produce a greater dispersion pattern, or a more random dispersion pattern than a planar impingement member, and thereby tends to create greater turbulence in the stream. At 120, FIG. 17 depicts that a wall of the ignition region may itself form an impingement member. In FIG. 18, an impingement member 110 with a non-static contact surface 122 is shown. By this, it is meant that surface 122 is configured to rotate, pivot or otherwise move as it is impacted by the pressurized feed stream. For example, surface 122 may include fins or other contact surfaces 124 that are rotatably mounted on an axis 126, about which the surfaces rotate as they are acted upon by feed stream 78 and/or the gas streams flowing within region 86.

Another example of a burner assembly 80 according to the present invention is shown in FIGS. 19 and 20. As shown in FIGS. 19 and/or 20, the burner assembly includes an ignition region 86 with an ignition source 88 that is positioned away from the primary region in which the atomized feed stream is mixed with air stream 74. Described in other words, the ignition source, which in FIGS. 19 and 20 takes the form of a spark plug, is positioned against a wall of the ignition region, while feed stream 78 is delivered to the region approximately in the center of the region relative to the ignition source. The burner assembly of FIGS. 19 and 20 also demonstrates an atomization assembly 94 that includes a nozzle 102 with a reduced-diameter orifice 100, as well as an impingement member 110 with a contact surface 112 positioned to be struck by feed stream 78 as the feed stream is delivered under pressure into the ignition region. As also shown, air stream 74 is delivered at an angle to the region. As shown, the air stream is oriented to promote swirling, and thus mixing, within the ignition region.

Another burner assembly 80 according to the invention is shown in FIGS. 21 and 22 and demonstrates an example of a burner assembly that is adapted to receive a liquid fuel stream (which in some embodiments is feed stream 78 and in others is carbon-containing feedstock 76), as well as a gaseous fuel stream, such as (but not limited to) byproduct stream 28. As perhaps best seen in FIG. 21, the illustrated burner assembly also demonstrates a valve assembly 96 that selectively apportions feed stream 78 to form a feed stream 16 for the hydrogen-producing region of the associated fuel processor, and/or to form a fuel stream 82 for the burner assembly. Another valve assembly 96' is also shown selectively regulating the flow of byproduct stream 28 to the burner assembly. While it is within the scope of the disclosure that the valve assembly may be manually actuated and/or controlled, it is preferable that the burner assembly and associated fuel processor include a computerized, or otherwise automated controller 98, such as is shown in FIG. 21 communicating with the valve assemblies via communication linkages 128, which may be any suitable form of communication line for control signals or any suitable mechanical linkage.

It is within the scope of the disclosure that burner assembly 80 is located external and spaced-apart from an associated fuel processor, in which case heated exhaust stream 66 is delivered to the fuel processor via suitable gas transport conduits, which preferably are insulated to reduce the heat loss during transfer of the exhaust stream. Typically, the burner assembly will be directly coupled to the fuel processor, and optionally at least partially contained within the shell or other housing of the fuel processor. In FIGS. 21 and 22, a mounting plate is shown at 130. Plate 130 is configured to be secured to the fuel processor to position and retain the burner assembly in an operative position therewith. Plate 130 may be welded to the fuel processor or otherwise secured thereto by another mechanism for fixedly securing the burner assembly to the fuel processor. By "fixedly securing" and "fixedly secured," it is meant that although it is possible to remove the plate, the fastening mechanism is not intended to be repeatedly removed and replaced, and commonly will be damaged during removal. Alternatively, a selectively removable fastening mechanism, such as bolts, threaded fittings, etc. may be used. By "selectively removable" and "removably received," it is meant that the fastening mechanism is designed to be repeatedly removed and reconnected.

Another burner assembly 80 according to the present disclosure is shown in FIG. 23. Similar to the burner assembly shown in FIGS. 21 and 22, the burner assembly of FIG. 23 is also adapted to receive byproduct stream 28 or another gaseous combustible fuel, such as to be used as an auxiliary fuel source to supplement, or in some applications, replace the fuel stream comprised of carbon-containing feedstock 76, and more typically feed stream 78. In FIG. 23, ignition source 88 is again illustrated as a spark plug, with the spark plug coupled to the burner assembly by an igniter mount 132. As positioned in FIG. 23, the spark plug is positioned beneath the level at which the atomized feed stream is introduced into the ignition region. Accordingly, the spark plug is sheltered from much of the heat that would otherwise be transferred to the spark plug if it was mounted within a region of the burner assembly where it was generally continuously within the flame produced as the feed and/or byproduct streams are combusted.

FIG. 23 also demonstrates a distribution plate 140 that is adapted to promote the turbulent mixing of byproduct stream 28 and air stream 74. As shown, the air stream is introduced into a chamber 142 on the opposite side of the plate as the orifice 100 of atomization assembly 94, which as shown includes a nozzle 102. In FIG. 23, atomization assembly 94 has been illustrated as a removable nozzle 102 that is threadingly received within a socket 143; however, it should be understood that any other suitable atomization member, such as those described and/or illustrated herein, may be used. As perhaps best seen in FIGS. 24 and 25, air stream 74 is delivered into the ignition region by a plurality of angularly oriented passages 144. The passages have outlets 146 that are oriented to direct the air flow into intersecting paths, and inlets 148 through which the air in the previously described and illustrated chamber 142 enters the passages. Although four sets of intersecting passages are shown in FIG. 24, it should be understood that the number of passages may vary, from a single passage to more than four sets of passages. Also shown in FIGS. 24 and 25 are distribution conduits 150 within the plate for delivering byproduct stream 28 to outlets 152, which are oriented to exhaust the byproduct gas stream in an intersecting path with at least a pair of the air streams, as perhaps best seen in FIG. 25, in which the intersection is schematically illustrated at 154.

It should be understood that the burner assemblies illustrated in FIGS. 21-26 are not required to utilize byproduct stream 28. As illustrated, the burner assemblies 80 are configured to receive and use liquid and gas fuel streams. Therefore, if byproduct stream 28 is delivered to the burner assemblies, then the byproduct stream is introduced into the ignition region. However, if no byproduct stream is delivered to the burner assemblies, then liquid feed stream 78 (or 82) can still be used.

As discussed previously with respect to FIG. 15, burner assemblies according to the present invention may include a reduced-area outlet 108 from the ignition region to promote additional mixing and/or combustion or within the ignition region. Similarly, because the combusting gas streams will be discharged from region 86 from the reduced-area opening, the combustion that occurs within heating chamber 92 will also tend to be more complete. In FIG. 26, the burner assembly of FIG. 23 is shown including an extension sleeve 160 that essentially extends the ignition region to provide additional space for combustion and/or mixing to occur before the gas stream is discharged into the heating chamber, or combustion region, 92. In FIG. 26, sleeve 160 is shown as a separately formed component from the rest of the housing for the burner assembly. Sleeve 160 may alternatively be integrally formed with other portions of the burner assembly's housing, such as shown in the subsequently discussed FIG. 28. As perhaps best seen by comparing FIGS. 26 and 27, sleeve 160 includes a neck 162 with outlet 108, which has a smaller cross-sectional area than the regions of ignition region 86 leading to the outlet.

Although the size of burner assembly 80 may vary within the scope of the disclosure, it is possible for burner assembly 80 to be relatively compact and yet still provide sufficient durability (such as for ignition source 88), mixing and combustion. For example, when the burner assembly shown in FIG. 26 is sized to receive 15-20 mL/min of feed stream 78, the ignition region may have an inside diameter of approximately 2.19 inches, an outlet 108 with an inside diameter of approximately 1.125 inches, a sleeve 160 length of approximately 1.125 inches, and an overall burner assembly length (measuring in the general direction of flow of feed stream 78) of approximately 3 inches.

In FIGS. 23 and 26, atomization assembly 94 was illustrated as including a removable nozzle 102 that is threadingly received into a socket within distribution plate 140. To illustrate that this configuration is but one of many suitable configurations that are within the scope of the invention, a variation of this structure is shown in FIGS. 28 and 29. As shown, the atomization assembly still includes a removable, threaded nozzle 102. However, in the burner assembly of FIGS. 28 and 29, the nozzle is adapted to be removably received into a nozzle plug 170, which is itself removably received into a nozzle sleeve 172 within chamber 142.

As discussed, burner assemblies 80 according to the present disclosure are configured to receive a liquid fuel stream that contains a carbon-containing feedstock, and which may also include water, such as when the burner assembly and the hydrogen-producing region of the associated fuel processor utilize the same (or nearly the same) feed stream. A benefit of such a construction is that the steam reformer or other fuel processor that produces hydrogen gas from water and a carbon-containing feedstock does not need to include more than a single supply, if the water and water-soluble liquid carbon-containing feedstock are premixed. If not, then the fuel processor still only requires a water supply and a carbon-containing feedstock supply. In contrast, conventional steam reformers with burner assemblies to heat the reformer require a fuel supply and associated delivery and monitoring systems for the burner assembly, and this fuel supply is independent from the fuel supply for the steam reformer.

As an illustrative example, startup of a fuel processor 12 in the form of a steam reformer is discussed below. During startup of a steam reformer or other fuel processor with burner assembly 80, at least a portion (if not all) of feed stream 78 is delivered to the burner assembly and combusted with air stream 74 to produce a heated exhaust stream that is used to heat the steam reformer. When the reformer has been heated to a selected, or predetermined, temperature, then the feed stream may be instantaneously switched to the reforming region instead of the burner assembly. Alternatively, a gradual transition may be used, in which the steam reformer begins receiving some, and then greater and greater amounts of the feed stream, while the burner assembly receives less and less of the feed stream. As hydrogen gas is produced in the reforming region of the steam reformer, and then purified in one or more separation regions 24, a gaseous byproduct stream 28 may be produced and may be delivered to the burner assembly to be used as a fuel stream. Typically, the predetermined temperature at which feed stream 78 begins to be delivered to the reforming region is less than the selected, or predetermined, reforming temperature, such as 25-125° C., and more typically 50-100° C., less than the reforming temperature. One reason for this is that the reforming reaction typically yields a resultant, or mixed gas stream, 20 that is hotter than the vaporized feed stream 78' delivered thereto. Therefore, there is a tendency for the reforming region to increase in temperature as the feed stream is reformed. Therefore, heating the reforming region to above the desired reforming temperature not only results in waste of fuel, but also may result in the reformer being overheated.

In some applications, such as most steam reformers in which the carbon-containing feedstock is methanol, the byproduct stream should have sufficient heating value that burner assembly 80 will not require any of feed stream 78 to maintain the reformer within its selected operating temperatures. However, when other carbon-containing feedstocks, and especially hydrocarbons, are used, it may be necessary to either continue to supply the burner assembly with some of feed stream 78 and/or use some of the product hydrogen steam as a fuel stream in order to provide sufficient fuel to maintain the temperature of the reformer.

In FIGS. 30-39, various illustrative examples of fuel processors 12 with burner assemblies 80 according to the present invention are shown. Still other examples of suitable steam reformers with which burner assemblies according to the present invention may be used are disclosed in the above-incorporated patents and patent applications, as well as in U.S. Provisional Patent Application Ser. No. 60/372,258, which was filed on Apr. 12, 2002 and is entitled "Steam Reforming Fuel Processor." The complete disclosure of each of these references is hereby incorporated by reference for all purposes. For the purpose of brevity, each of the above-discussed elements, variants thereof, and optional additional elements for burner assemblies and fuel processors according to the present disclosure will not be indicated and discussed in the following illustrative examples. For correlational purposes, illustrative ones of the reference numerals introduced above have been included in FIGS. 30-39; however, and as discussed, each of these numerals is not rediscussed below. It is within the scope of the disclosure that other burner assemblies described, illustrated and/or incorporated herein may be used in place of the illustrative examples of atomizing burner assemblies depicted in FIGS. 30-39. For example, any of the previously described atomizing burner assemblies or any of the subsequently described diffusion burner assemblies may be used in place of the illustrative examples depicted in FIGS. 30-39. As discussed, it is also within the scope of the disclosure that the burner assemblies illustrated in FIGS. 30-39 may be utilized in other applications, including in other types and/or configurations of fuel processors.

Figure 30:
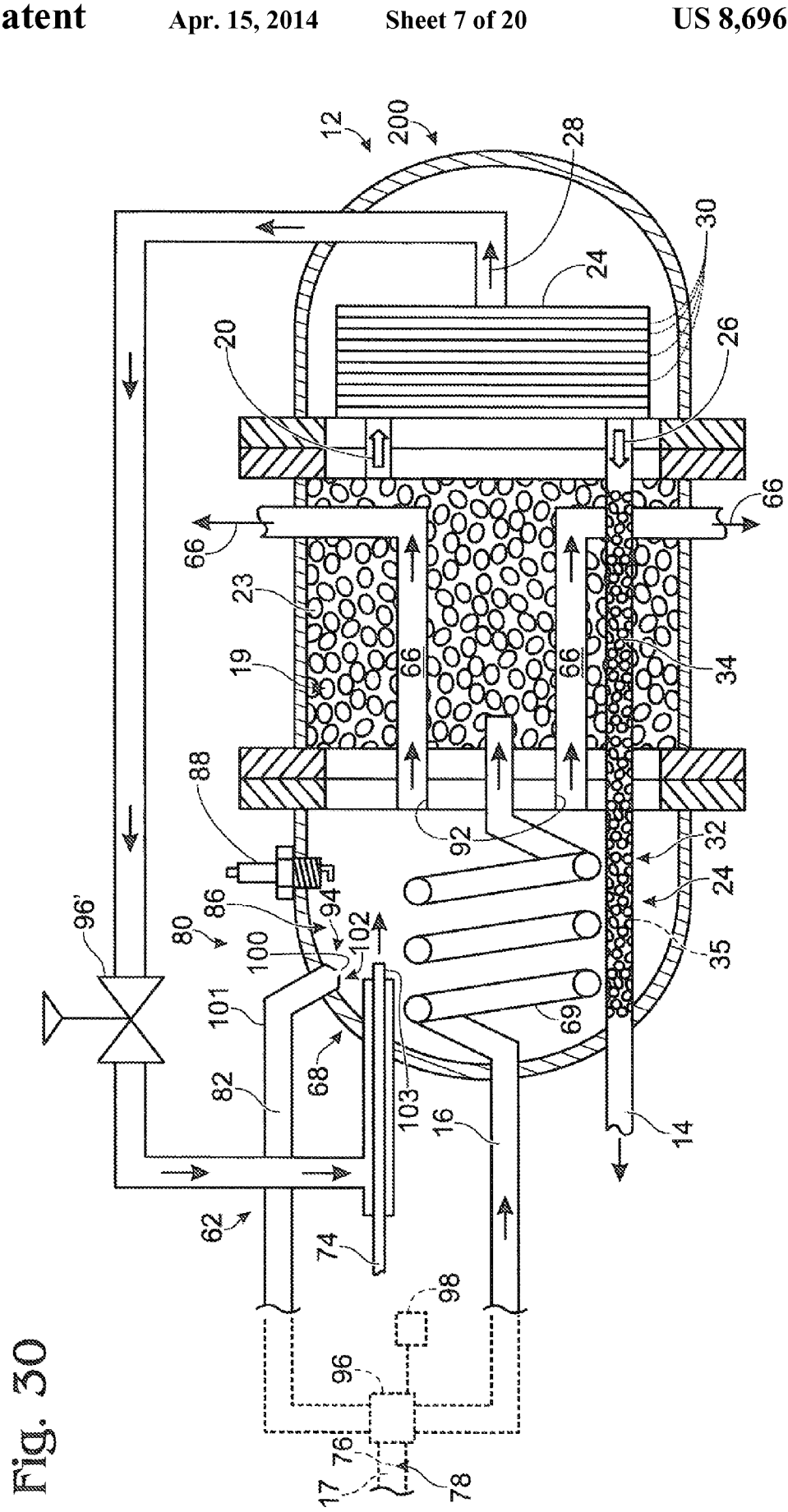
FIG. 30 is a cross-sectional view of a fuel processor that includes a burner assembly according to the present disclosure.

In FIG. 30, an illustrative fuel processor 12 is shown that is adapted to produce a mixed gas stream containing hydrogen gas and other gases by steam reforming a feed stream 16 containing water 17 and a carbon-containing feedstock 76. Steam reforming fuel processor 200, which may be referred to as a steam reformer, includes a hydrogen-producing region 19 that contains steam reforming catalyst 23. As shown, the hydrogen-producing region and atomizing burner assembly 80 are adapted to receive feed/fuel streams 82 and 16, respectively, that contain water and a carbon-containing feedstock. Fuel processor 200 also provides an illustrative example of a vaporization region 69, in which feed stream 16 is vaporized prior to delivery to the hydrogen-producing region of the fuel processor. Fuel stream 82 is combusted with air stream 74, and the heat produced thereby is used to vaporize the feed stream and to heat the reforming catalyst in the hydrogen-producing region to a selected reforming temperature, or range of temperatures. In the illustrated embodiment, the heated exhaust stream from the burner assembly flows through passages that extend through the hydrogen-producing region. As shown, reforming catalyst 23 surrounds the conduits containing the heated exhaust stream. It is within the scope of the disclosure that other configurations may be used, such as in which the reforming catalyst is housed in conduits, or beds, around which the heated exhaust stream passes.

As also indicated in FIG. 30, atomizing burner assembly 80 is also adapted to receive the gaseous byproduct stream 28 from separation region 24, such as may be produced by one or more hydrogen-selective membranes 30 that are schematically illustrated in FIG. 30. As discussed, burner assembly 80 (or one of the subsequently described diffusion burner assemblies 262) may be adapted to utilize liquid and/or gaseous combustible fuel streams. It is within the scope of the disclosure that the burner assembly may use one type and/or composition of fuel stream during some operating states of the fuel processor, such as during start up of the fuel processor, and other types and/or compositions of fuel stream during other operating states of the fuel processor, such as during a hydrogen-producing state and/or an idle, or standby, operating state.

Figure 31:
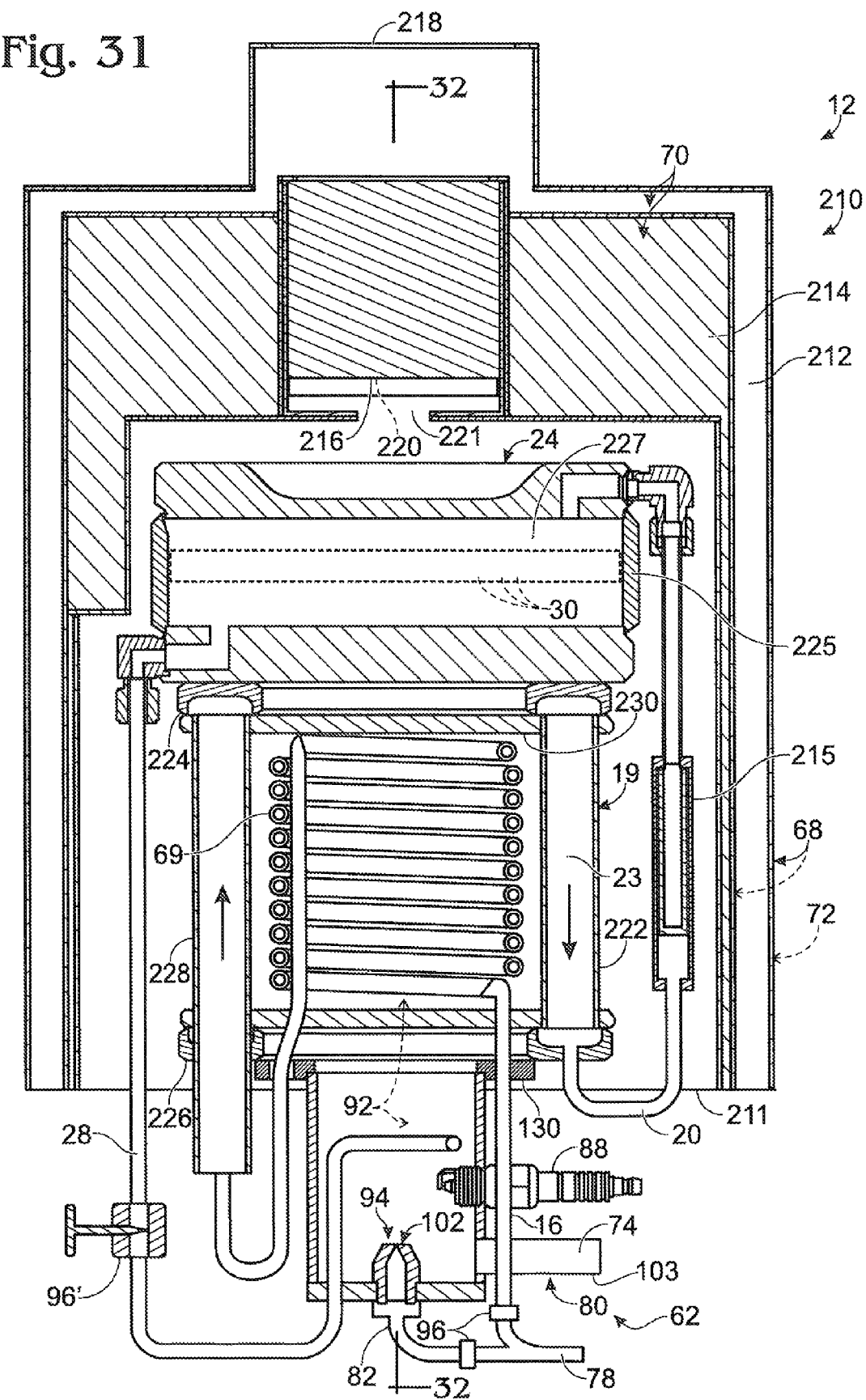
FIG. 31 is a cross-sectional view of another fuel processor that includes a burner assembly according to the present disclosure.
Figure 32:
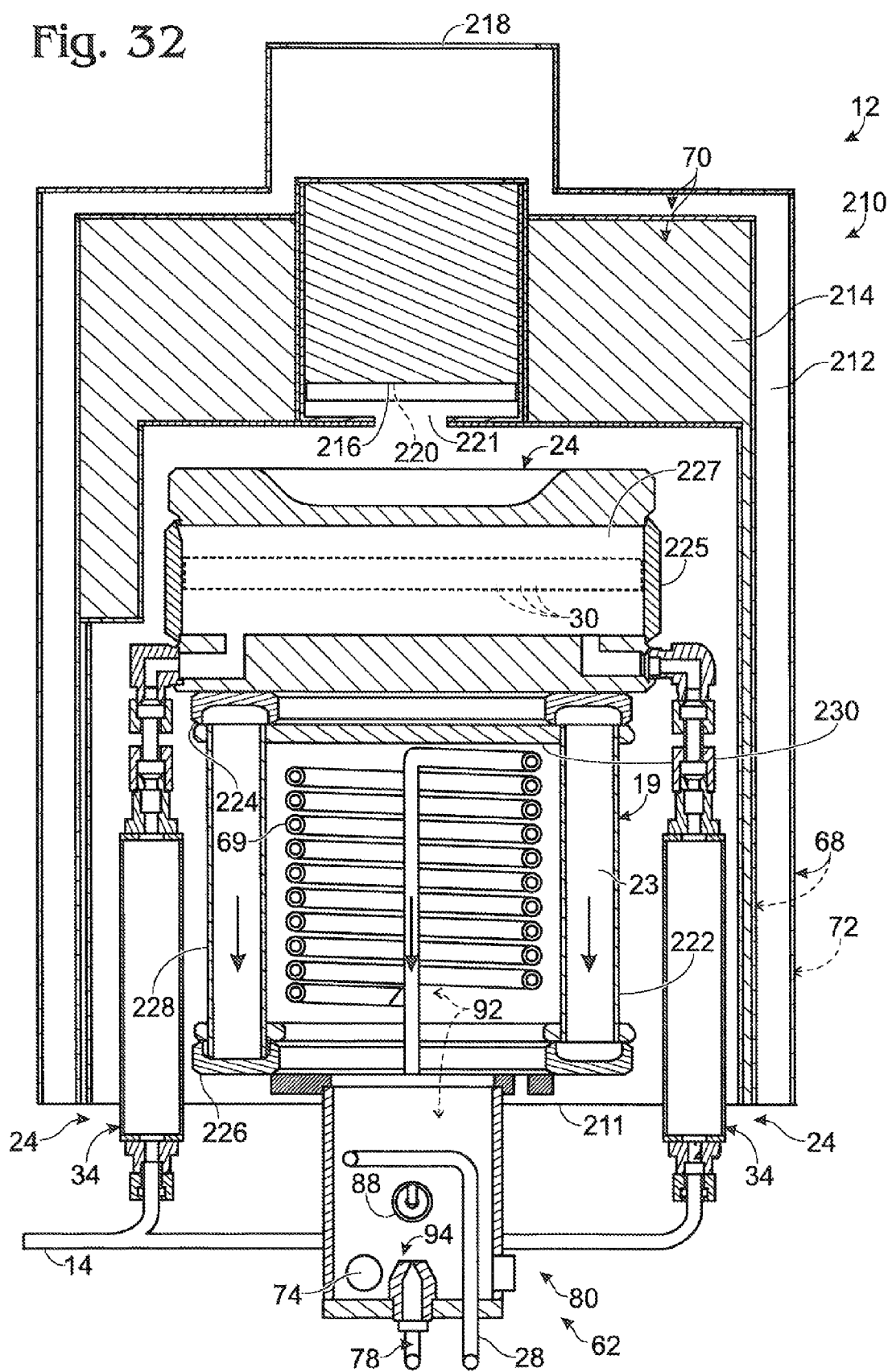
FIG. 32 is a cross-sectional view of the fuel processor of FIG. 31 taken along the line 32-32 in FIG. 31.
Figure 36:
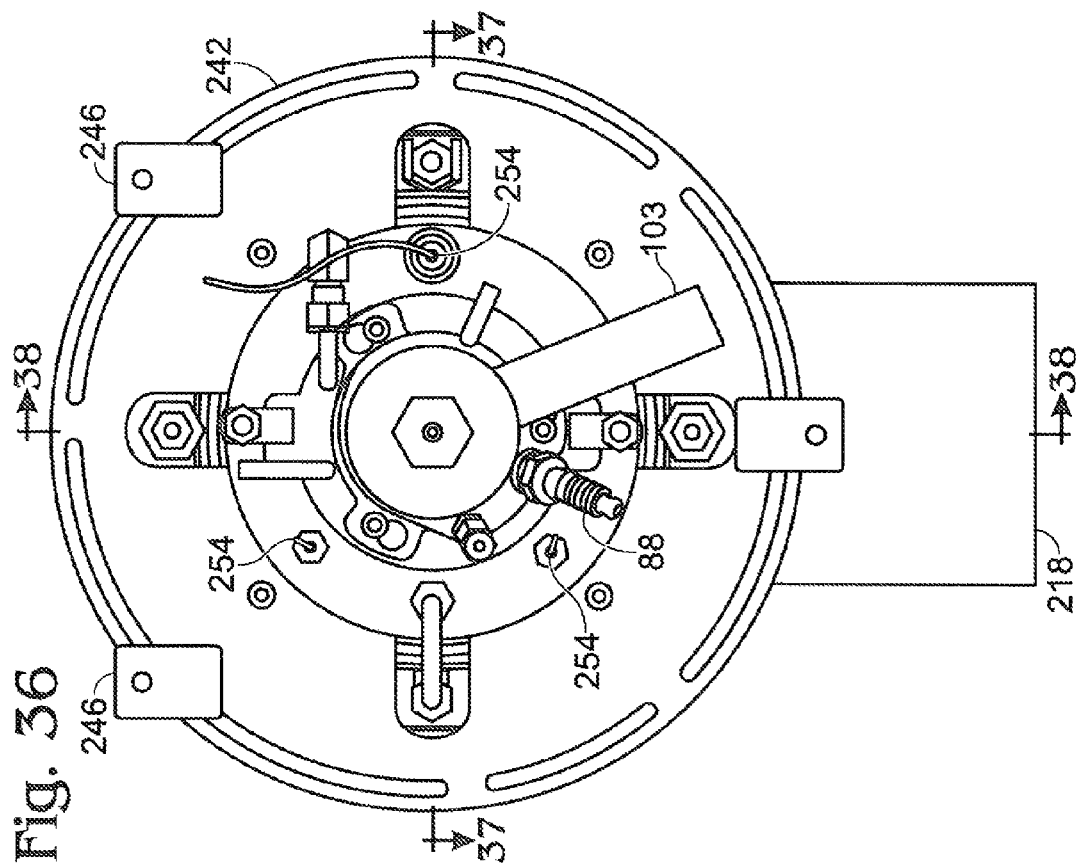
FIG. 36 is bottom plan view of the fuel processor of FIG. 33.
Figure 39:
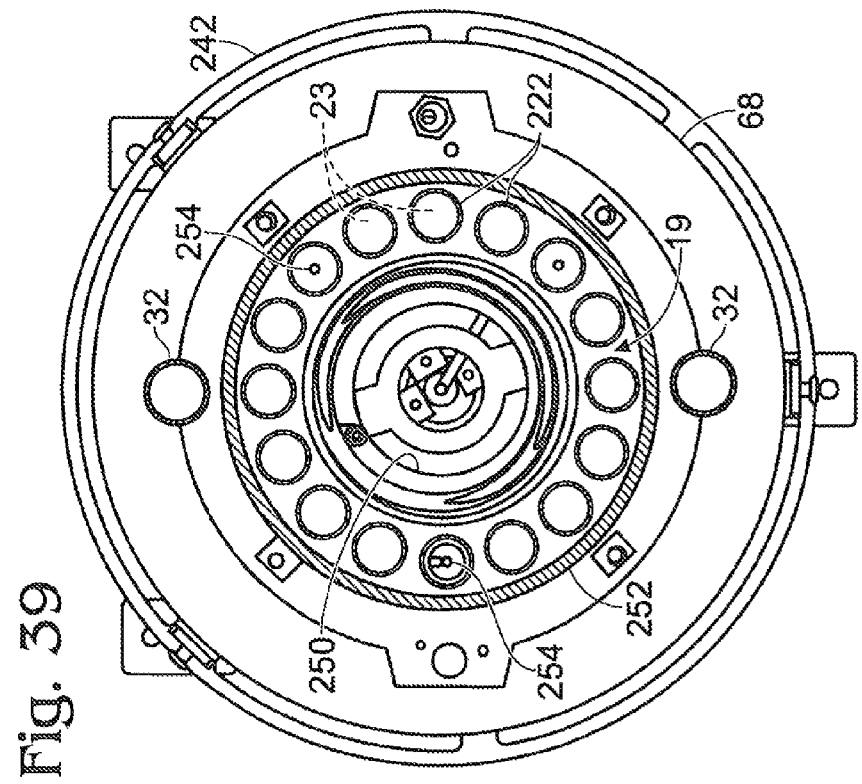
FIG. 39 is a cross-sectional view of the fuel processor of FIG. 33.
Figure 37:
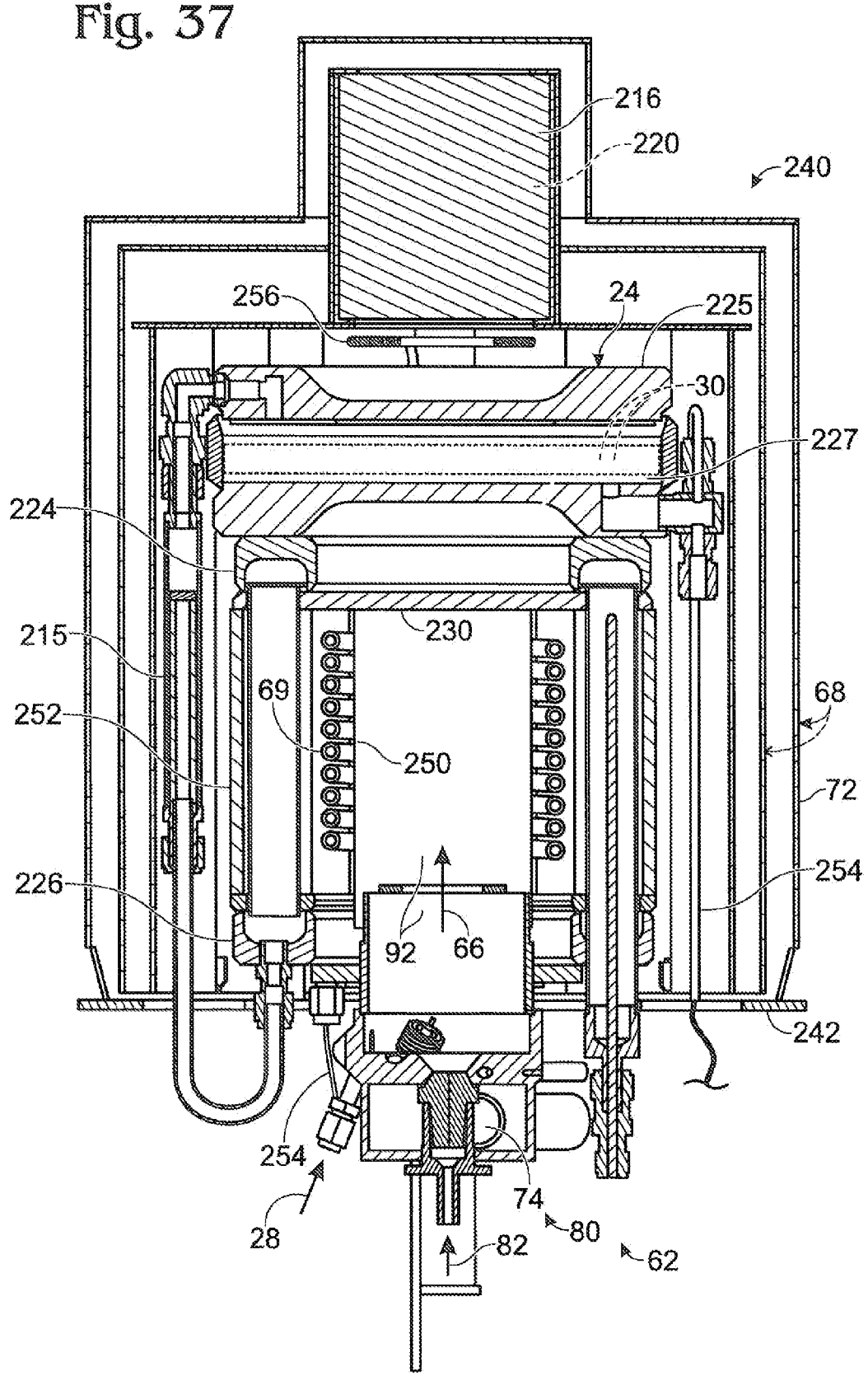
FIG. 37 is a cross-sectional view of the fuel processor of FIG. 33 taken along the line 37-37 in FIG. 36 and with the legs of the support assembly removed.
Figure 38:
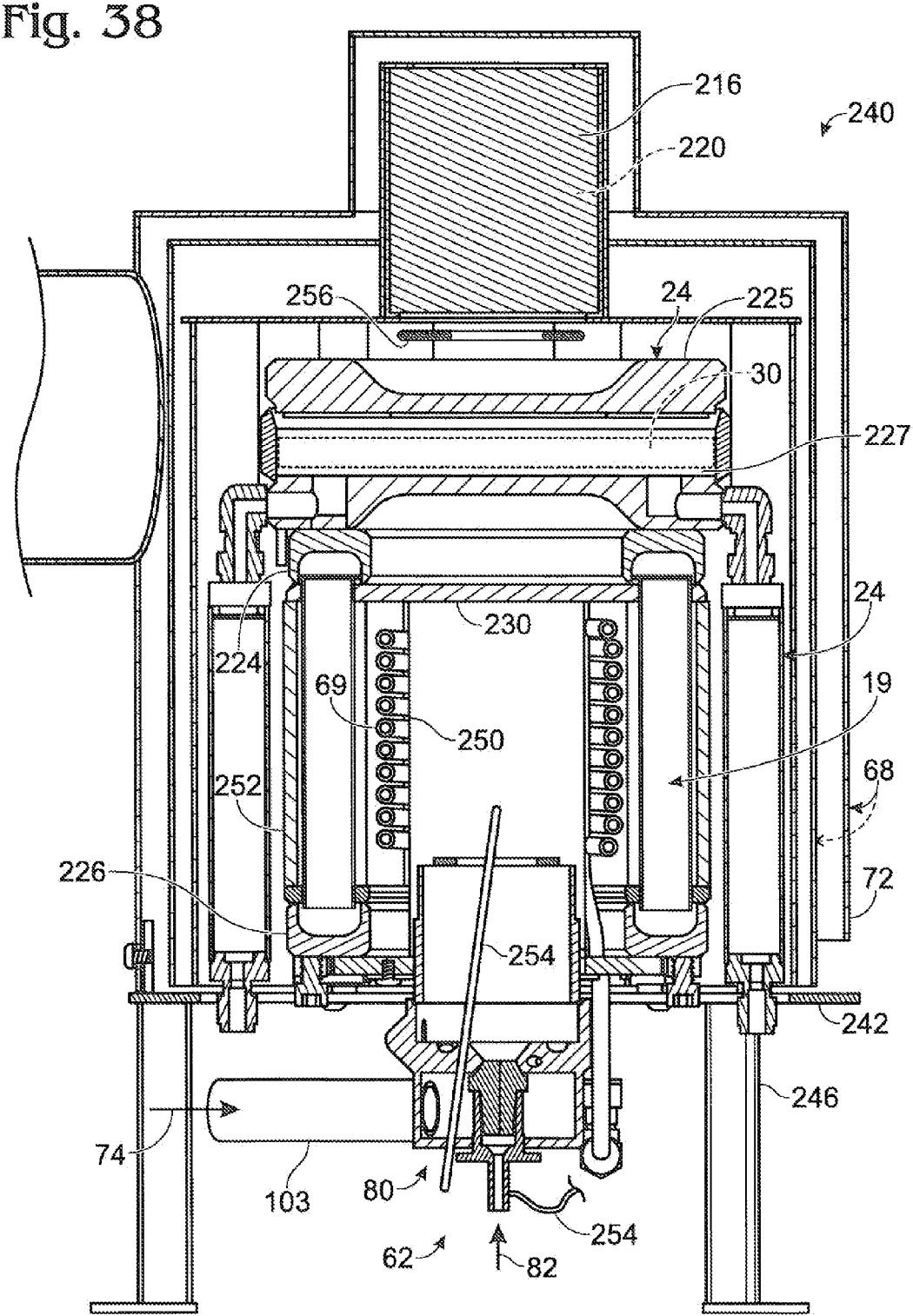
FIG. 38 is a cross-sectional view of the fuel processor of FIG. 33 taken along the line 38-38 in FIG. 36.

FIGS. 31 and 32 depict another example of a fuel processor 12 that is adapted to produce hydrogen gas via a steam reforming reaction. As shown, the steam reforming fuel processor is generally indicated at 210 and is configured to have a vertical orientation, in contrast to the illustrative horizontal configuration shown in FIG. 30. Although not required, a benefit of a vertical orientation in which the burner assembly introduces the heated exhaust stream generally within a chamber or annulus defined by at least the hydrogen-producing region of the steam reformer is that the reforming catalyst beds (or other hydrogen-producing region used in other fuel processors within the scope of the present disclosure) are provided with a thermal symmetry relative to the heated exhaust stream. As shown, the burner assembly extends generally beneath the hydrogen-producing region of the fuel processor and produces a heated exhaust stream that flows into a combustion region 92 that is at least partially surrounded by the hydrogen-producing and vaporizing regions of the fuel processor. The illustrated burner assembly 80 has the configuration of the burner assembly that was previously described with respect to FIGS. 21 and 22. As discussed, however, any of the atomizing and diffusion burner assemblies described, illustrated and/or incorporated herein may be used in place of the illustrated burner assembly.

Reformer 210 provides a graphical example of a fuel processor that includes at least one insulated shell 68. As indicated in solid lines, the reformer may be described as including an insulating shell 68 that encloses at least a substantial portion of the reformer. In the illustrated example, shell 68 defines a compartment into which the hydrogen-producing, vaporization and vaporization regions of the fuel processor are housed, with the shell defining an opening 211 to which a base, or mount, for the fuel processor is coupled to the shell. As shown, shell 68 includes various types of insulating material 70, such as an air-filled cavity, or passage, 212 and a layer of solid insulating material 214. The depicted examples of insulating materials are separated by inner layers of shell 68, although it is within the scope of the disclosure that other shell and/or insulating configurations maybe used, including fuel processors that do not include an external shell. As indicated in dashed lines in FIGS. 31 and 32, shell 68 may alternatively be described as being surrounded by an insulating jacket 72, such as with air-filled cavity 212 separating the shell from jacket 72.

FIGS. 31 and 32 depict examples of several different types of filters that may be used with fuel processors according to the present disclosure. For example, at 215 in FIG. 31 a filter is shown positioned to remove particulate or other types of impurities from reformate (mixed gas) stream 20 prior to delivery to separation assembly 24. Also shown in both FIGS. 31 and 32 is an exhaust filter 216 that is adapted to remove selected impurities or other materials from the heated exhaust stream produced by the burner assembly before the exhaust stream exits shell 68, such as through exhaust opening 218. As indicated in dashed lines, one type of suitable exhaust filter is a catalytic converter 220, although others may be used. Also shown in FIGS. 31 and 32 is an orifice 221 through which the exhaust stream passes from an inner chamber of the shell.

Similar to the exemplary atomizing burner assembly 80 shown in FIG. 30, the burner assembly shown in FIGS. 31 and 32 is adapted to combust with air (such as from air stream 74) and at least one of a gaseous and a liquid fuel stream. As perhaps best seen in FIG. 31, a common feed stream 78 may be used to supply both a liquid fuel stream 82 to the burner assembly and a reforming feed stream 16 to the hydrogen-producing (steam reforming) region 19 of the fuel processor. In such an embodiment, stream 78 contains both water and a liquid carbon-containing feedstock. As also shown, the gaseous byproduct stream 28 from a separation region 24 also may be consumed as fuel for the burner assembly.

In the illustrated embodiment, the fuel processor utilizes a separation region that contains at least one hydrogen-selective membrane 30 to separate the reformate (mixed gas) stream produced in the hydrogen-producing region into a hydrogen-rich stream 26 and a byproduct stream 28. As shown, this separation region takes the form of a module, or housing, 225 that defines a compartment 227 into which reformate stream 20 is delivered under pressure and separated into streams 26 and 28. In FIGS. 31 and 32, this membrane module utilizes generally planar membranes 30 that extend generally transverse to the reforming catalyst beds and the central axis of the burner assembly. The feed stream for the reformer is vaporized in vaporization region 69, which takes the form of a central coil that surrounds at least a portion of combustion region 92. The vaporized feed stream is distributed to a plurality of reforming catalyst beds 222 by a distribution manifold 224. The reformate stream produced in beds 222 is collected in a collection manifold 226 and thereafter delivered to an internal compartment 227 of the membrane module. At 228, an optional fluid transfer conduit is shown. Conduits 228, which extend generally between upper and lower portions of the hydrogen-producing region of the reformer may be used to control whether various fluid streams flow generally in the direction of the heated exhaust stream (away from the burner assembly) or generally toward the burner assembly. For example, the selected direction of flow may be used to control the temperature of the fluid within the stream or that is delivered to various regions of the reformer. As also shown, an insulating member, or heat shield, 230 may be used to protect the membrane module from being overheated by the burner assembly. For example, in the context of hydrogen-selective palladium-copper membranes, it is generally preferable (although not required) to maintain the membranes at a temperature that is less than approximately 450° C.

Reformer 200 also provides an example of a fuel processor that includes more than one type of separation region 24. As shown in FIG. 30, the fuel processor also includes a separation region that includes a carbon monoxide removal assembly 32, such as a methanation region that contains methanation catalyst 34, with this second separation region being positioned downstream from a separation region 24 that contains hydrogen-selective membranes 30. Accordingly, methanation region 34 is positioned to further purify the hydrogen-rich stream produced by the hydrogen-selective membranes.

In FIGS. 33-39 another illustrative example of a steam reforming fuel processor utilizing a burner assembly according to the present disclosure is shown and generally indicated at 240. Reformer 240 has a similar configuration to reformer 210. Reformer 240 is shown including a burner assembly 80 that is similar in configuration to the burner assembly shown in FIGS. 28 and 29 to provide a graphical example that the illustrative reformer may be used with any of the burner assemblies described, illustrated and/or incorporated herein. For the purpose of continuity, many of the above discussed structure and reference numerals are depicted in FIGS. 33-39. However, each of these structures and/or reference numerals will not be rediscussed below. The illustrated example of a steam reforming fuel processor includes an optional base, or base plate, 242 having a plurality of supports, or legs, 246. Several optional sensors 254 are also illustrated.

Reformer 240 provides a graphical illustration that the steam reformers and other fuel processors with burner assemblies according to the present disclosure may include heat distribution structure that is adapted to normalize, or even out the temperature distribution produced by the heated exhaust stream from the burner assembly in the combustion region. In this region, even when there is thermal symmetry of the vaporization region and/or hydrogen-producing region, it is possible that "hot spots" or localized regions of elevated temperature may occasionally occur within the combustion region and/or vaporization region. As shown in FIGS. 34 and 37-39, reformer 240 includes a pair of heat diffusion structures 250 and 252. Structure 250 is adapted to reduce and/or dissipate these hot spots as heat is transferred from combustion region 92 to vaporization region 69. Diffuser 250 is adapted to provide a more even temperature distribution to vaporization region 69 than if the diffuser was not present. Because the diffuser will conduct and radiate heat, hot spots will tend to be reduced in temperature, with the heat in hotter areas distributed to surrounding areas of the diffuser and surrounding structure. An example of a suitable material for diffuser 250 is FeCrAlY or one of the other oxidation-resistant alloys discussed above.

In embodiments of reformer 240 (or other fuel processors) that include a diffuser, a suitable position for the diffuser is generally between the vaporization region and the heating assembly, as indicated with diffuser 250 in FIGS. 34 and 37-39. The diffuser typically will extend at least substantially, if not completely, around the vaporization region and/or the heating assembly. Another suitable position is for the diffuser to surround hydrogen-producing region 19, as illustrated at 252. It is within the scope of the disclosure that one or more diffusers may be used, such as in an overlapping, spaced-apart and/or concentric configuration, including a reformer that includes both of the illustrative diffuser positions shown in FIGS. 34 and 37-39.

In the illustrative configurations shown in FIGS. 34 and 37-39, the plurality of reforming catalyst beds 222 may be described as collectively defining inner and outer perimeters, with the diffuser extending at least substantially around at least one of the inner and/or the outer perimeters of the plurality of reforming catalyst beds. At least diffuser 250 should be formed from a material through which the combustion exhaust may pass. Examples of suitable materials include woven or other metal mesh or metal fabric structures, expanded metal, and perforated metal materials. The materials used should be of sufficient thickness or durability that they will not oxidize or otherwise adversely react when exposed to the operating parameters within reformer 240. As an illustrative example, metal mesh in the range of 20-60-mesh has proven effective, with mesh in the range of 40-mesh being preferred. If the mesh is too fine, the strands forming the material will tend to oxidize and/or will not have sufficient heat-conducting value to effectively diffuse the generated heat.

As discussed herein, steam reformers and other fuel processors with burner assemblies according to the present disclosure will often be in communication with a controller that regulates the operation of at least a portion of the burner assembly and/or the entire fuel processor, fuel processing system, or fuel cell system responsive to one or more measured operating states. An example of a suitable controller for a steam reforming fuel processor is disclosed in U.S. Pat. No. 6,383,670, the complete disclosure of which is hereby incorporated by reference for all purposes. Accordingly, the reformers may include various sensors 254, such as temperature sensors, pressure sensors, flow meters, and the like, of which several illustrative examples are shown in FIGS. 34-39.

Also shown in FIGS. 34-35 and 37-38 is an optional evaporator 256 that is adapted to vaporize any residual liquid-water content in exhaust stream 66. In many embodiments, evaporator 256 will not be necessary. However, in some embodiments, additional fluid streams are mixed with the exhaust stream external hydrogen-producing region 19 to reduce the temperature of the resulting stream. As an example, the cathode air exhaust from a fuel cell stack may be mixed with stream 66. This air exhaust stream has a vapor pressure of water that exceeds the stream's saturation point. Accordingly, it contains a mixture of liquid water and water vapor. To prevent water from condensing or otherwise depositing within the reformer or other fuel processor, such as on separation region 24, evaporator 256 may be used.

Another burner assembly 62 according to the present disclosure is schematically illustrated in FIG. 40 and generally indicated at 262. As shown, burner assembly 262 includes a diffusion region 270 in which a combustible fuel stream 64 is mixed with an air stream 74 to form an oxygenated combustible fuel stream 74. Therefore, and in contrast to burner assemblies that receive premixed streams of fuel and oxidant, burner assemblies according to at least this aspect of the present disclosure receive at least one combustible fuel stream and at least one air/oxygen stream, and then mix these streams in diffusion region 270. Although described herein as an air stream 74, it is within the scope of the disclosure that stream 74 may have a greater oxygen content than air, that the stream may be otherwise depleted in components present in air, enriched in one or more of these components, and/or contain one or more components that are not normally present in air. In the illustrated embodiment, the fuel stream is a gaseous combustible fuel stream 276.

Diffusion region 270 includes diffusion structure 278 that is adapted to promote the formation of one, and typically a plurality of, oxygenated combustible fuel streams 274, as schematically indicated in FIG. 40. The oxygenated combustible fuel stream, which may also be referred to as the oxygenated fuel stream is then delivered to a combustion region 92, where it is ignited to produce a heated exhaust stream 66, which may also be referred to herein as a combustion stream 66. Combustion region 92 includes at least one ignition source 88, which is adapted to ignite the oxygenated fuel stream. Ignition source 88 may optionally be described as being within an ignition region 86 within the combustion region. An example of a suitable diffusion structure 278 is a structure that promotes mixing of the gaseous streams into a relatively uniform mixture of air/oxygen and gaseous fuel. The resulting stream 274 will tend to burn cleaner and more efficiently than if the diffusion structure is not present.

As shown in FIG. 41, burner assemblies 262 according to the present disclosure may additionally or alternatively include a distribution region 284, in which at least one of the air and/or fuel streams is divided into a plurality of smaller streams. Accordingly, distribution region 84 includes distribution structure 86, which is adapted to receive and divide at least one of the fuel and air streams into a plurality of smaller streams. Although not required, burner assemblies 262 that receive a primary air stream and a primary fuel stream preferably include distribution regions 284 that are adapted to receive and divide each of these streams into a plurality of smaller streams. This is schematically illustrated in FIG. 41, where air stream 74 is divided into a plurality of smaller air streams 74' and fuel stream 276 is divided into a plurality of smaller fuel streams 276'. As shown, streams 72' and 276' are mixed in diffusion region 270 to produce a plurality of oxygenated fuel streams 274, which are ignited in combustion region 92. As used herein in the context of the flows of fluid streams, "smaller" refers to the mass/molar flow rate of the streams compared to the corresponding mass/molar flow rate of the primary stream.

An example of a suitable distribution structure 286 is structure that subdivides the air and combustible fuel streams into a plurality of smaller streams that are delivered in pairs or other groupings of at least one of each subdivided stream to an ignition source. This configuration provides cleaner, more efficient combustion of the original fuel stream because the overall flow of the fuel stream is divided into smaller streams that are mixed with one or more corresponding air streams. This configuration enables better overall diffusion, or mixing, of the streams and enables combustion to be completed with a smaller flame than a comparative burner assembly in which the fuel and oxidant streams are not divided prior to combustion. As indicated in dashed lines in FIG. 41, distribution region 284 is preferably configured to divide the fuel and air streams without mixing, or enabling diffusion, of the streams. Therefore, although illustrated schematically as a single box in FIG. 41, the distribution region may be implemented as separate regions for the air and the fuel streams and/or may include distribution structure that is adapted to maintain the fuel and air streams separate from one another until the smaller streams are delivered to diffusion region 270.

Burner assemblies 262 according to the present disclosure may additionally or alternatively be configured to receive a combustible fuel stream 64 in the form of a liquid combustible fuel stream 82. Illustrative, non-exclusive examples of liquid combustible fuel streams 82 include streams that contain as at least a majority component one or more liquid alcohols or hydrocarbons. An example of such a burner assembly is schematically illustrated in FIG. 42. As shown, fuel stream 82 is delivered to a vaporization region 92, in which the stream is vaporized to form a vaporized fuel stream 294. The vaporized fuel stream is delivered to distribution region 284, where it is divided into a plurality of smaller fuel streams 294'. As shown, distribution region 284 also receives air stream 74 and divides the air stream into a plurality of smaller air streams 74'. Streams 74' and 294' are delivered to diffusion region 270, where they are mixed in selective pairs or similar groupings to produce a plurality of oxygenated fuel streams 274'.

FIG. 42 also graphically illustrates in dashed lines that burner assemblies 262 according to the present disclosure may additionally or alternatively be configured to receive and combust both liquid and gaseous combustible fuel streams 82 and 276. In embodiments where the burner assembly also receives a combustible gaseous fuel stream 276, streams 294, 294' and 274' will contain both vaporized and gaseous combustible fuels.

As shown in FIG. 42, the burner assembly includes a vaporizing heating assembly 296 that is adapted to heat the vaporizing region to vaporize the liquid combustible fuel stream. Also shown in FIG. 42 is a fuel stream 298 for the vaporizing heating assembly. Stream 298 will tend to vary in composition and/or form depending upon the particular structure of vaporizing heating assembly 296. For example, when assembly 296 is adapted to combust a combustible fuel stream, then stream 298 will contain such a stream. Similarly, when assembly 296 is an electrically powered heating assembly, then stream 298 will include an electrical connection to a power source (including, but not required to be or limited to, fuel cell stack 40 and/or battery 52).

For purposes of illustration, the components of the burner assemblies shown in FIGS. 40-42 have been illustrated as being spaced-apart from each other, with the corresponding streams being delivered between these components. Although not required, actual burner assemblies will typically have at least one, if not all of these components housed together within, and/or collectively define, a common shell or housing. For example, the entire burner assembly may be contained within a shell or housing. As another example, two or more of the burner assemblies' functional regions may be integrated or otherwise contained within a common shell or housing. As an illustrative example of this alternative, the diffusion and combustion regions may be integrated together so that the air and fuel streams are separately introduced into the combustion region, but introduced in a manner that promotes diffusion of the streams as they are introduced and ignited.

Figure 43:
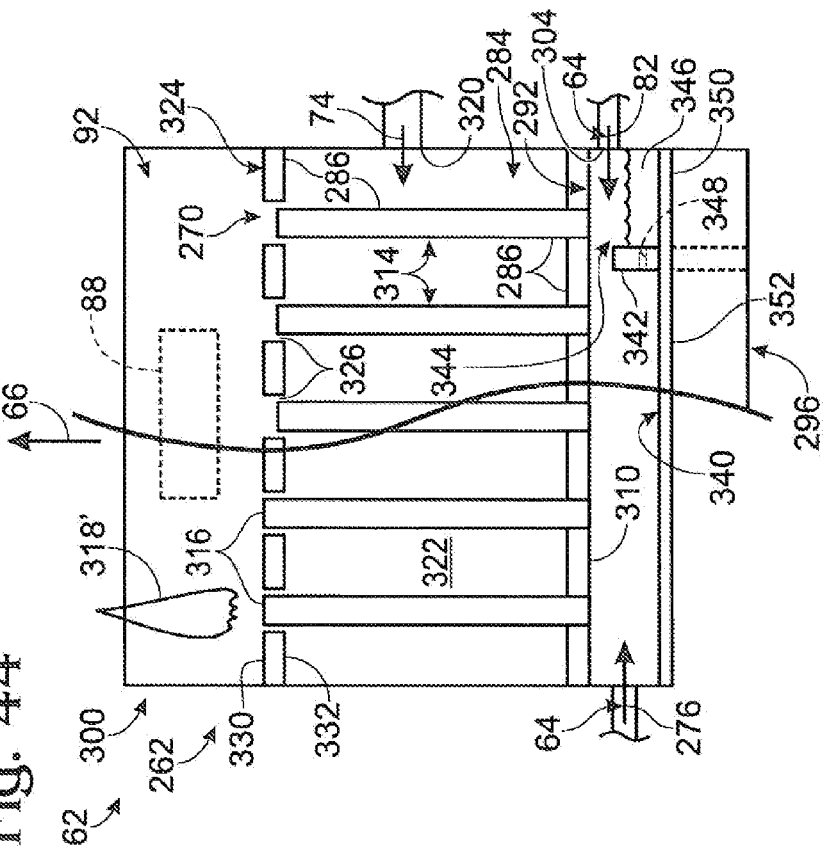
FIG. 43 is a side cross-sectional view of another burner assembly according to the present disclosure.

FIG. 43 provides a less schematic example of a diffusion burner assembly 262 according to the present disclosure. As shown and generally indicated at 300, the burner assembly is configured to receive gaseous and/or liquid combustible fuel streams 64 through respective gas and liquid input ports 302 and 304. Although only a single one of each port is shown in FIG. 43, it is within the scope of the disclosure that two or more of each port may be used. When burner assembly 300 is adapted to receive both liquid and gaseous fuel streams, the burner assembly will typically be installed with each port connected via suitable conduits to respective supplies from which the fuel streams are obtained. When the burner assembly is adapted to receive only a gaseous or only a liquid fuel stream, one of the ports may be eliminated, blocked, or otherwise not functionally present in the burner assembly.

As shown in FIG. 43, liquid stream 82 is delivered to vaporization region 292, where it is vaporized and forms vaporized fuel stream 294, such as by heat provided by vaporizing heating assembly 296. Instead of being delivered as a single vaporized gas stream to combustion region 92 (with or without premixing of air), the vaporized gas stream must pass through distribution region 284, where distribution structure 286 divides the vaporized fuel stream 294 into a plurality of streams 294'. Furthermore, streams 294' are then mixed through diffusion with a corresponding plurality of air streams 74', and the resulting oxygenated fuel streams 274' are combusted to collectively produce hot combustion stream 66. Therefore, burner assembles 262 according to the present disclosure are configured to receive combustible fuel and air streams, and divide these streams into a plurality of streams that each contain only a minority, and often 10% or less, of the original flow. The smaller streams are then mixed, ignited, and recombined to form combustion stream 66.

As shown in FIG. 43, distribution structure 286 includes a fuel distribution manifold 310, which includes a plurality of fuel apertures 312 into which the vaporized fuel stream may flow into a corresponding plurality of fuel tubes 314. In the illustrated embodiment, apertures 312 define the inlets to tubes 314. As shown, the tubes are spaced-apart from each other and extend from manifold 310 to combustion region 92, where the tubes terminate at outlets 316 from which the fuel streams are delivered into the combustion region. Therefore, instead of receiving a single vaporized fuel stream with a flow rate that is at least approximately equal to the flow rate of the original liquid fuel stream that was delivered to vaporization region 292, the combustion region receives a plurality of vaporized fuel streams that each contain only a minority fraction of the original flow. For example, each stream may contain 25% or less of the original flow. It is within the scope of the disclosure that each stream may contain less than 20%, less than 15%, less than 10%, less than 5%, between 1-10%, or between 2-5% of the original flow. It should be understood that the percentage of the original flow that passes through the individual tubes is largely dependent upon the number of such tubes that are present and available to receive the vaporized fuel stream. Accordingly, it should also be understood that the number of tubes shown in FIG. 43 has been selected for representation purposes only and that the actual number may vary, such as depending upon one or more of the desired flow rate through each tube and the desired proportion of the total flow desired through each tube.

Figure 44:
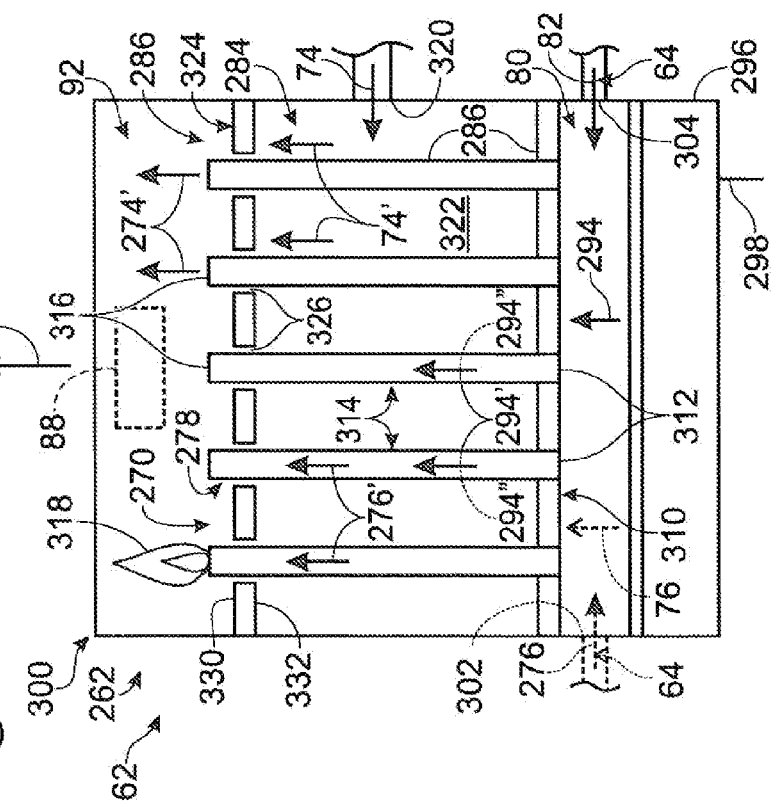
FIG. 44 is a fragmentary cross-sectional view showing variations of the burner assembly of FIG. 43.

The number and size of tubes 314 is preferably, but not required to be, selected to maintain the flow velocity of the combustible fuel passing through the tubes to be below the flame-front velocity of the particular fuel. By this it is meant that the combustible fuel streams preferably are not flowing at such a velocity, or fluid flow rate, that the flames lift off of the outlets 316 of the tubes. For purposes of illustration a flame is shown in FIG. 43 at 318. As shown, the flame may be described as being attached to outlet 316 because combustion is initiated at the outlet, as opposed to at a region spaced above the outlet. This latter, less desirable situation is schematically illustrated in FIG. 44 at 318'. Flame 318' tends to be less stable than flame 318, and will often result in less efficient combustion and a less uniform flame. As such, the flame is more likely to flameout and may also impinge against adjacent structure that would not be impinged against by flame 318. This impingement may produce undesirable combustion byproducts, lower the heating value of the combustible fuel stream, and/or damage or weaken the impinged upon structure. Although tubes 314 are shown in FIGS. 43 and 44 as having right cylindrical configurations, it is within the scope of the disclosure that other cross-sectional and lengthwise configurations may be used. Similarly, stainless steel tubes have proven effective in experiments, but it is within the scope of the disclosure that any other suitable material may be used. Preferably the tubes are not configured so that the vaporized fuel stream is cooled to the point of condensing, as the condensed liquid may obstruct the tubes and prevent further passage of vaporized fuel therethrough.

Preferably, each tube 314 forms a portion of manifold 310 or is otherwise in fluid communication therewith such that any gas passing through one of apertures 312 passes into the tube and cannot flow into the subsequently described air distribution chamber 322. Fuel distribution manifold 310 may, in at least some embodiments, be referred to as a distribution plenum, in that it maintains the pressure within vaporization region 292 at least slightly greater than the pressure in the plurality of fuel tubes. This pressure differential promotes distribution of the vaporized fuel stream between the tubes, and in embodiments where both gaseous and vaporized fuel streams are present in vaporization region 292, promotes mixing of the streams within vaporization region 292.

When burner assembly 300 receives a gaseous combustible fuel stream 276 in addition to liquid combustible fuel stream 82, the gaseous fuel stream is also delivered to the vaporization region, where it mixes with the vaporized fuel stream and the resultant stream is distributed between the fuel tubes. This is schematically illustrated in dashed lines in FIG. 43, where the tubes are shown including streams 294'', which contain both gaseous and vaporized combustible fuels. It is within the scope of the disclosure that the gaseous and vaporized fuel streams may be only partially mixed prior to entering the fuel tubes and that further mixing or diffusion of the streams may occur within the individual fuel tubes. Similar to the above discussion of the flow rates of streams 294', it should be understood that each of the streams 294'' will include a minority fraction of the original flows of the liquid and gaseous combustible fuel streams, with the above-described illustrative percentages being again applicable.

As discussed, the burner assembly additionally or alternatively may be implemented or configured so that it only receives a gaseous combustible fuel stream 276. In such an application or implementation, the vaporization region may be referred to as a staging region, in that the gaseous combustible fuel stream is delivered into the region and then divided into a plurality of smaller streams 276' by fuel distribution manifold (or plenum) 310.

Burner assembly 300 also includes at least one air input port 320 through which air stream 74 is delivered into distribution region 284. As shown in FIG. 43, the air stream is delivered into an air distribution chamber 322 in which the air may flow around the plurality of fuel tubes. As also shown in FIG. 43, the distribution structure includes a combustion distribution manifold 324. Manifold 324 is adapted to divide the air stream 74 that is delivered into chamber 322 into a plurality of air streams 74', with each stream 74' containing only a minority fraction of the original air stream. For example, each stream may contain 25% or less of the original flow. It is within the scope of the disclosure that each stream may contain less than 20%, less than 15%, less than 10%, less than 5%, between 1-10%, or 2-5% of the original flow. In at least some embodiments of the burner assembly, combustion distribution manifold 324 may be referred to as a combustion plenum, in that it maintains the pressure within chamber 322 at least slightly greater than the pressure within combustion region 92. This pressure differential promotes the even flow of air into the combustion region and restricts the flow of the fuel streams into the air distribution chamber.

As shown in FIG. 43, manifold (or plenum) 324 includes a plurality of apertures 326 through which air streams 74' flow into the combustion region. As also shown, the apertures are sized so that tubes 314 may extend into, and in the illustrated embodiment through, the apertures. As shown, the tubes are concentrically located within apertures 326 so that each fuel stream (such as 276', 294' or 294") is surrounded by a corresponding air stream 74' as it exits the corresponding tube 314. As each fuel stream exits its corresponding tube 314, it is mixed through diffusion with the surrounding air stream 74' to produce an oxygenated fuel stream 274', which is ignited, such as by ignition source 86. As such, the region in which the air and fuel streams are diffused together may be referred to as the diffusion region of the burner assembly, with the configuration of outlets 316 and apertures 326 providing the diffusion structure, which enables the pairs of air and fuel streams to diffuse together. The hot combustion gases produced from the plurality of streams 274' collectively form a hot combustion stream 66.

The distribution of the combustible fuel and air streams into a plurality of smaller, and optionally concentric, streams enables the burner assembly to complete combustion of the fuel streams with a smaller flame than otherwise would be obtained if the original streams were not divided. As the number of tube and aperture assemblies is increased for a fixed feed of fuel/air, the proportional flow through each tube decreases. As such, the distance required for complete diffusion and combustion of the fuel delivered by that assembly will tend to be reduced. For example, the subsequently described and illustrated burner assembly shown in FIGS. 45-50 is adapted to complete combustion of combustible fuel delivered at a flow rate of 60 mL/min within 6 inches, and more commonly within approximately 4 inches of outlets 316.

Similar to the above discussion about the velocity at which the plurality of fuel streams are delivered to the diffusion and combustion regions, air streams 74' are also preferably delivered to the diffusion and combustion regions at velocities that do not cause or promote flameout or separation of the flames from outlets 316. It should be understood that the size of apertures 326 may be selected to provide the desired mass/molar flow of oxygen without producing an undesirable velocity for the air stream.

Preferably, air streams 74' are delivered so that at least the stoichiometric amount of oxygen required for complete combustion is delivered to each combustible fuel stream. For example, a liquid combustible fuel stream that contains a mixture of approximately 70% (by volume) methanol and the balance water stoichiometrically requires approximately 40 L/min air. Preferably, and to provide an excess, or buffer, of oxygen, more than the stoichiometrically required amount of oxygen is delivered. For example, the oxygen in streams 74' may be present at greater than approximately 1, 2, 3 or more times the stoichiometrically required amount of oxygen for a particular composition of combustible fuel. An air stream 74' that contains an oxygen component that is present in the range of 1.1-1.3 times the stoichiometrically required amount of oxygen has proven effective, but other oxygen flow rates that are above and below this amount may be used and are within the scope of the disclosure.

Burner assemblies 262 constructed according to the present disclosure may be effectively utilized with several times the stoichiometrically required amount of oxygen. For example, when 200-500% excess air is delivered to the burner assembly, the burner assembly still effectively combusts the fuel streams and produces a hot combustion stream. The impact of this excess air is that the flame will be cooler, or in other words, hot combustion stream 66 will not be as hot as a comparative stream produced with less excess air. The amount of excess air provides a mechanism by which the amount of heat produced by the burner assembly may be controlled by controlling the rate at which air is delivered to the burner assembly. As discussed above, when it is envisioned that the burner assembly will be utilized in such an excess air configuration, apertures 126 may be sized so that the resulting streams 74' of excess air do not travel at sufficient velocities to cause flameout, and preferably are sized so that the flames are not separated from outlets 316.

In the embodiment illustrated in FIG. 43, each fuel tube 314 extends through one of apertures 326 in combustion manifold 324. In this configuration for diffusion structure 278, the portion of air stream 74 that passes through each aperture 326 produces an airflow that surrounds the respective outlets of the fuel streams. A benefit of such a configuration is that the combustible fuel stream is delivered above combustion manifold 324, thereby reducing the chance that the combustible fuel will flow into the diffusion region external the tubes. It is within the scope of the disclosure, however, that one or more of the fuel tubes may have outlets 316 that are co-terminus with the combustion- or distribution-faces (330 and 332, respectively) of combustion manifold 324, anywhere in between, or even that the tubes terminate prior to reaching manifold 324. Because the air stream is delivered into the distribution region external the tubes and cannot flow into vaporization region 292, the air stream will create a positive flow of gas from distribution region 284 to the diffusion and combustion regions 270 and 92. Examples of several of the above-described variations are graphically illustrated in FIG. 44. As shown, tubes 314 on the left side of FIG. 44 do not extend beyond the combustion-surface 330 of manifold 324, and the tubes 314 on the right side of FIG. 44 terminate generally between the combustion- and distribution-surfaces 332 and 330 of manifold 324.

As discussed, burner assemblies 262 according to the present disclosure may be configured to receive only one of a gaseous or a liquid combustible fuel stream. In embodiments or applications where only a gaseous combustible fuel stream is received, it should be understood that heating assembly 96 is not required. In fact, when the burner is configured to only receive gaseous combustible fuel streams, the burner assembly may be formed without the vaporizing heating assembly, as shown on the left side of FIG. 44. When the burner assembly is selectively used with either or both of the above fuel streams, the burner assembly will tend to be present, but will generally not be used when only a gaseous fuel stream is received into the vaporization region.

On the right side of FIG. 44, several optional configurations are shown for vaporization region 292 and the corresponding vaporizing heating assembly 296 of burner assemblies that are configured to receive a liquid combustible fuel stream, either alone or in addition to a gaseous combustible fuel stream 276. As shown, vaporization region 292 includes a base 340 and a partition 342 that extends from the base generally toward fuel distribution manifold 310. Partition 342 creates a well, or reservoir, 344 into which liquid combustible fuel stream 82 is initially delivered upon introduction into the vaporization region. Reservoir 344 enables a volume of liquid combustible fuel stream 82 to be delivered into the vaporization region and to pool or accumulate, in the reservoir. The level of the pooled stream will rise until it reaches the height of the partition, at which point the delivery of an additional amount of stream 82 will cause some of the stream to pour over the partition. When this occurs, then at least the portion that pours (or spatters) over the partition will contact the region 352 of base 340 that does not extend under reservoir 344, where it is vaporized by heat provided by heating assembly 296.

A benefit of this configuration is that the burner assembly has a "reserve" or "buffer" 346 of liquid combustible fuel. For example, should the flow rate of stream 82 to burner assembly 300 be interrupted or otherwise non-uniform, the reserve can be vaporized as it is heated to maintain a flow of vaporized fuel to the combustion region. While the flow of vaporized fuel from the reservoir when no new liquid combustible fuel is being delivered to the reservoir may be less than the corresponding flow that would be produced if stream 82 was uniformly delivered to the burner assembly, it still provides a mechanism by which the flame created in combustion region 92 is less likely to be extinguished. Therefore, the reservoir may be described as a mechanism for leveling, or equalizing, the flow of combustible fuel to combustion region 92 relative to the rate at which it is delivered to vaporization region 292. A benefit of this construction is that unstable delivery of combustible fuel to the combustion region may cause flameouts, such as when there is no flow of combustible fuel or a period of low flow followed immediately by a period of much greater flow. Even when these fluctuations do not cause the flame to be completely extinguished, they will still tend to cause instability in the flame, such as flare-ups and periods of incomplete combustion. Therefore, burner assemblies with the structure shown in FIG. 44 are less likely to encounter flameout, or unstable combustion, situations than conventional liquid-fuel burners that do not have this structure.

As a variation of the above construction, partition 342 may include one or more ports, channels or similar conduits 348 therethrough that enables some of the liquid combustible fuel stream to flow through the partition. Preferably, the conduit or conduits are sized such that the flow rate of combustible liquid fuel that flows through the conduits per unit time is not greater than the flow rate of stream 82 into the vaporization region. In other words, when partition 342 includes one or more conduits 348, stream 82 is preferably delivered into the vaporization region at a flow rate that exceeds the rate at which the liquid fuel flows through the one or more conduits 348. In this configuration, a reserve of liquid fuel will be established and continuously replenished as long as the flow of stream 82 is not interrupted or diminished for a sufficient time that the reserve of liquid fuel is depleted, such as by flowing through the partition and/or being vaporized. However, as long as the reservoir contains a supply of liquid fuel that may flow through the partition and be vaporized, the net flow of vaporized fuel to distribution region 284 will be comparatively stable or normalized, even if the flow rate of stream 82 tends to vary over time.

For example, one suitable mechanism for delivering stream 82 to vaporization region 292 is to use a pump. Some pumps, such as reciprocating piston pumps, deliver liquid in intervals (such as during half of each piston cycle) and therefore do not provide a constant flow of stream 82. Accordingly, a reciprocating piston pump will tend to deliver flows of stream 82 in intervals, and the use of partition 342 (with or without conduit(s) 348) can stabilize or normalize the flow of vaporized fuel produced therefrom.

As indicated at the bottom of FIG. 44, it can be seen that the vaporization heating assembly may be configured to heat the entire base 340 of the vaporization region, including the portion of the base that underlies reservoir 344. A benefit of this construction is that all of the liquid fuel stream will be eventually vaporized by the vaporizing heating assembly. An alternative configuration is schematically illustrated in dashed lines. In this alternative configuration, the vaporization heating assembly is adapted to either not directly heat the portion 350 of the base beneath the reservoir, or to not heat that region to as high of temperature as the portion 352 of the base upon which the liquid combustible fuel stream is intended to be vaporized. For example, the vaporization heating assembly may be located generally beneath only portion 352. Expressed in different terms, the reservoir may be offset or otherwise located distal the heating assembly. As an additional or alternative implementation, portion 350 may be insulated or formed from a material which is not as conductive as the material from which the rest of the base is formed.

Figure 45:
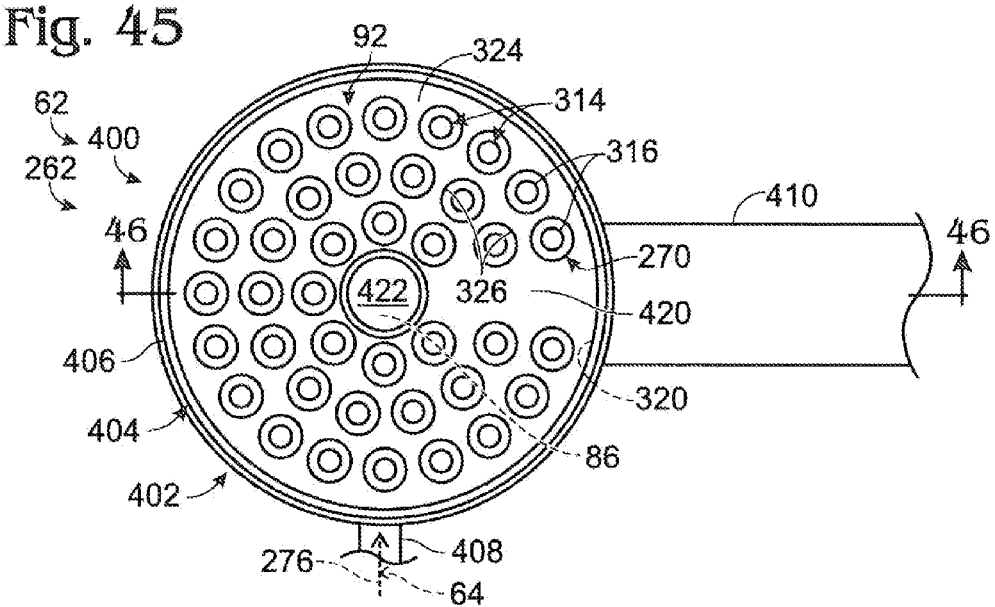
FIG. 45 is a top plan view of another burner assembly according to the present disclosure.
Figure 46:
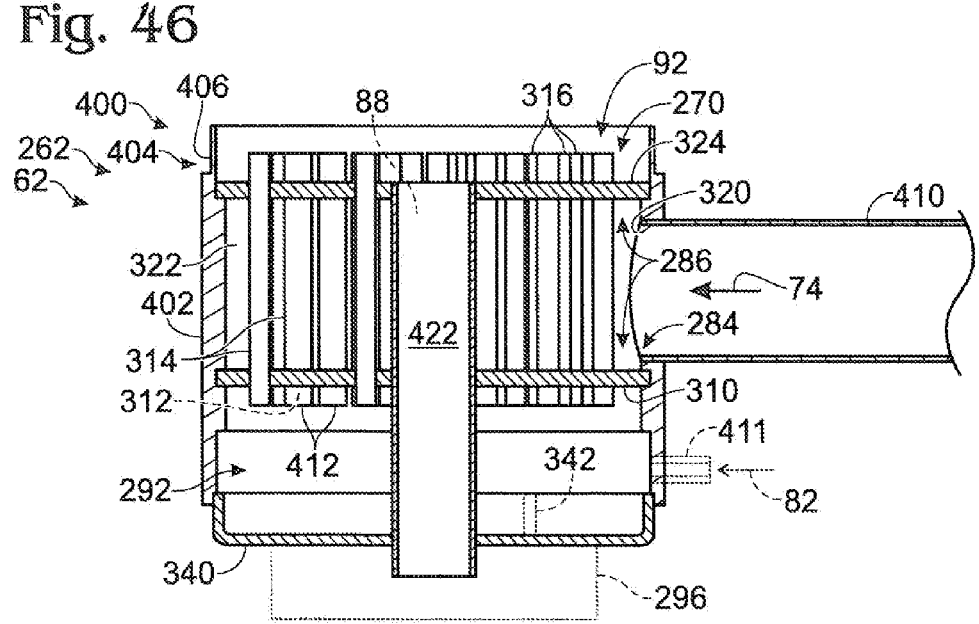
FIG. 46 is a side cross-sectional view of the burner assembly of FIG. 45, taken along the line 46-46 in FIG. 45.

Another burner assembly 262 constructed according to the present disclosure is shown in FIGS. 45 and 46 and generally indicated at 400. As used herein, similar elements and subelements will retain the same reference numerals between the various illustrative embodiments of the burner assemblies, fuel processing and fuel cell systems disclosed and/or illustrated herein. It is within the scope of the disclosure that these later-referenced structures may (but are not required to) have the same elements, subelements and variations as the earlier presented structure. As an illustrative example, burner assembly 400 includes a vaporization region 292 with a partition 342. However, and similar to previously discussed embodiments, it is within the scope of the disclosure that burner assembly 400 may be formed without a reservoir and/or with a reservoir that includes one or more conduits 348 that extend through the partition. As another example, although the fuel tubes shown in FIG. 46 extend through combustion distribution manifold 324, it is within the scope of the disclosure that the tubes may have any of the other relative positions, geometries and the like that are illustrated and/or described herein. For the purpose of simplifying the drawings, every subelement and/or optional structure will not be repeatedly discussed and/or labeled in each illustrated view of burner assemblies according to the present disclosure.

As shown in FIGS. 45 and/or 46, burner assembly 400 includes a housing 402 within which its combustion, diffusion and distribution regions are housed. In the illustrated embodiment, housing 402 has a generally cylindrical configuration and includes a mount 404 that is sized to couple the burner assembly with a fuel processor. As shown, mount 404 takes the form of a reduced-diameter neck 406, although it is within the scope of the disclosure that the mount may have other configurations, such as projecting flanges, struts, threads, and the like, and that the housing may be formed without a mount. It is also within the scope of the disclosure that housing 402 may have any other suitable shape and that the housing may be formed from a greater number of components than is shown in FIGS. 45 and/or 46. Also shown are a fuel supply conduit 408 for combustible fuel stream 64 (such as gaseous combustible fuel stream 276) and an air supply conduit 410 for air stream 74. In the illustrated embodiment shown in solid lines, the burner assembly is adapted to receive only gaseous combustible fuel streams. However, a vaporizing heating assembly 296, supply conduit 411 for a liquid combustible fuel stream 82, and optional partition 342 are shown in dashed lines and would generally be present in a version of burner assembly 400 that is configured to receive and vaporize a liquid combustible fuel stream.

Burner assembly 400 also demonstrates another suitable configuration for tubes 314 and gas distribution manifold (or plenum) 310. Unlike the previously illustrated embodiments, such as illustrated in FIGS. 43 and 44, in which tubes 314 extended from apertures 312 in manifold 310, burner assembly 400 demonstrates that the tubes may project though the apertures in manifold 310. As such, tubes 314 include inlets 412 that are located within vaporization region 292.

As perhaps best seen in FIG. 45, the burner assembly includes a plurality of tubes 314 concentrically positioned within a corresponding plurality of apertures 326 in combustion distribution manifold 324. Although not required, burner assembly 400 illustrates that manifold 324 may include a portion 420 proximate air input port 320 that contains no apertures and corresponding tubes, or proportionally less apertures and tubes. As shown, portion 420 corresponds to an area where the distribution of apertures 326 (and therefore tubes 314) would be present in a symmetrical distribution. However, portion 420 corresponds to an area where the apertures are asymmetrically distributed, and as shown in FIG. 45, not present. A benefit of this configuration is that absence (or optional reduced number) of apertures 326 in manifold 324 proximate input port 320 promotes the distribution of the air stream throughout air distribution chamber 322.

FIGS. 45 and 46 also demonstrate that burner assemblies 262 according to the present disclosure may include a chamber, or passage, 422 through which ignition source 88 may be mounted and/or inserted into and removed from the burner assembly. When ignition source 88 is within passage 422 it will tend to be shielded from direct contact with the flames that are produced as the fuel streams are ignited. Although not required, it can be seen in FIGS. 45 and 46 that the air streams 74' surrounding the passage 422 will provide a flow of air that will tend to shield the ignition source from the flames produced as the fuel streams are ignited.

As perhaps best seen in FIG. 46, passage 422 extends through the burner assembly to base 340, thereby enabling the ignition source to be removed from a burner assembly that is mounted (such as via a mount 404) to a fuel processor. A benefit of this construction is that ignition sources which require periodic servicing or replacement may be used with burner assemblies according to the disclosure without requiring the entire burner assembly to be removed from the fuel processor simply to inspect, service or remove/replace the ignition source. Instead, and as perhaps best seen in FIG. 46, the ignition source may be inserted within the passage, and selectively removed therefrom through base 340, such as for inspection, maintenance or replacement.

Figure 47:
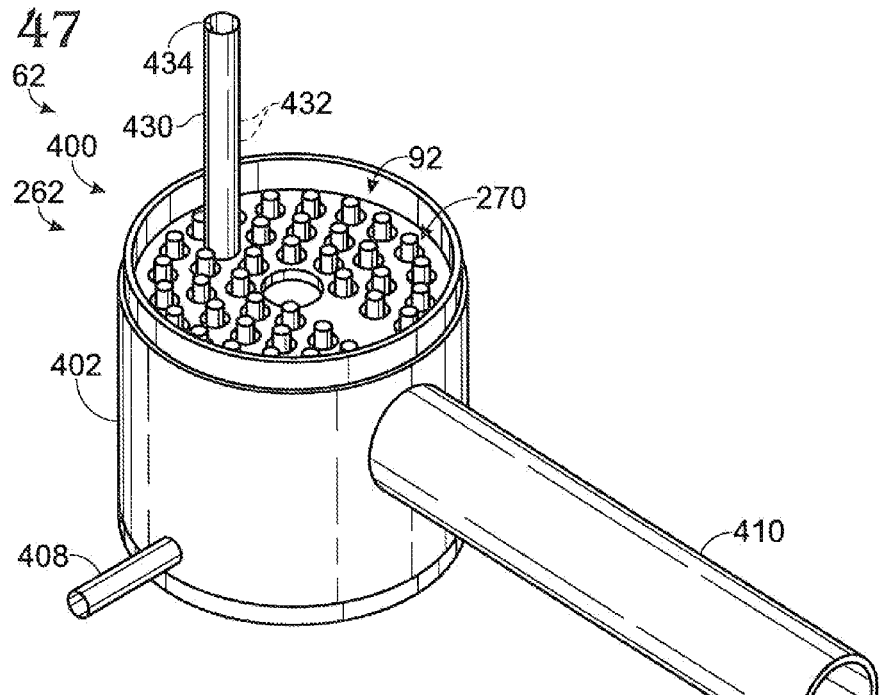
FIG. 47 is an isometric view of a variant of the burner assembly of FIG. 45.
Figure 48:
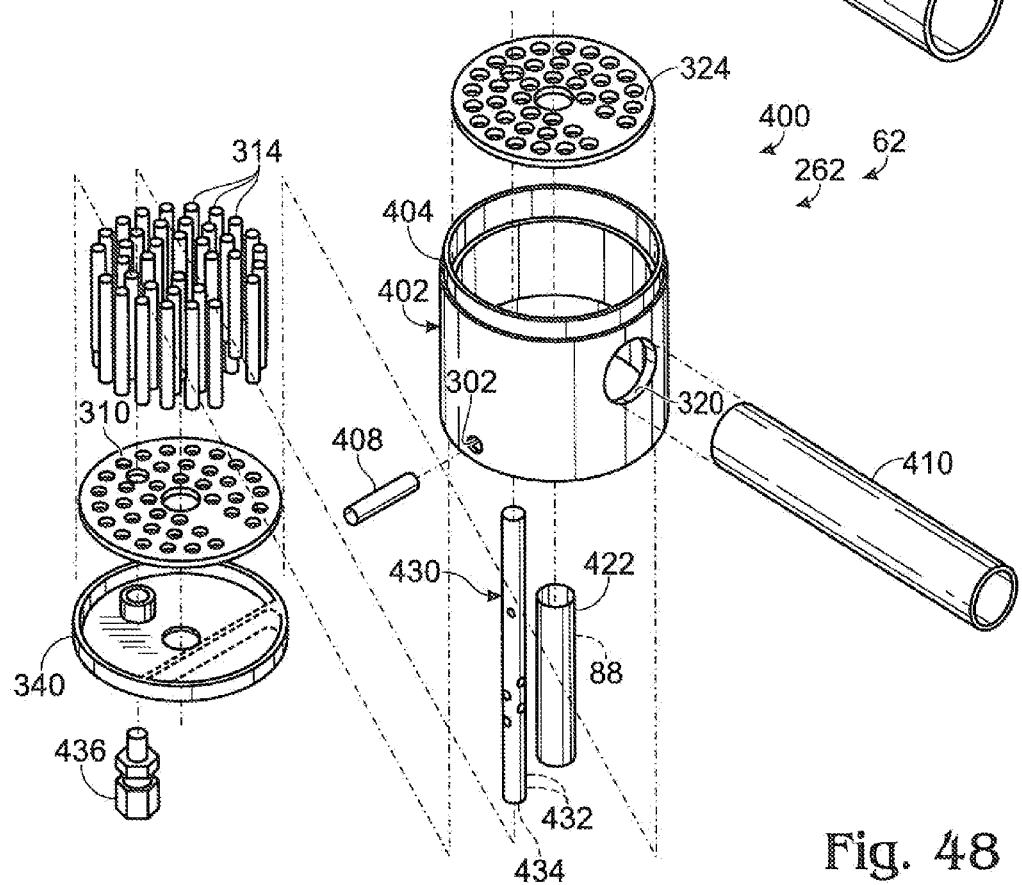
FIG. 48 is an exploded isometric view of the burner assembly of FIG. 47.

A variation of burner assembly 400 is shown in FIGS. 47 and 48. As shown, the burner assembly includes a sleeve 430 that extends from vaporization region 292 through combustion region 92 and into which one or more temperature sensors 432, such as thermocouples or other suitable temperature sensors, may be inserted. The inclusion of temperature sensors enables the operating state of the burner assembly to be determined by a processor or other suitable monitor in communication with sensor(s) 432. For example, the sensor(s) may be used to detect if combustion has commenced in the combustion region. As another examples, if the burner assembly is no longer generating (or maintaining) heat, such as if the supply of combustible fuel has been interrupted, the flames have been extinguished, etc., this may be detected using the temperature sensors. Furthermore, the measured temperatures from one or more regions of the burner assembly may be used to control or adjust the operating state of the burner assembly. For example, when the burner assembly is initially preheated by vaporization heating assembly 296 (as will be discussed subsequently), a temperature sensor 432 may be used to determine when a selected preheat temperature has been reached. As another possible, but not required, application of temperature sensors 432, the sensors may be used for safety reasons, namely, to sense if a region of the burner assembly has exceeded a predetermined threshold temperature. Sleeve 430 may also be referred to as a sensor port or a mount for one or more thermocouples or other temperature sensors.

In the illustrated embodiment, sleeve 430 defines a passage 434 that is accessible through base 340 of the burner assembly. Similar to the above discussion regarding passage 422, this configuration enables temperature sensors or other measuring equipment to be inserted into and removed from the burner assembly while the burner assembly is mounted on a fuel processor. In the illustrated embodiment, sleeve 430 extends through each of the above-discussed regions of the burner assembly, thereby enabling the temperature of each of these regions to be selectively measured through the insertion of suitable sensors 432 at the appropriate location within the sleeve. Also shown in FIG. 48 is a mount 436 that retains sleeve 430 and/or sensor(s) 432 within the burner assembly.

In FIGS. 49-51, another version of the burner assemblies of FIGS. 45-48 is shown and generally indicated at 400'. As shown, the burner assembly is adapted to receive and vaporize a liquid combustible fuel stream 82 through liquid fuel supply conduit 411. Burner assembly 400' may be configured to only receive liquid combustible fuel streams, in which case supply conduit 408 and its corresponding input port may be omitted. Similarly, although the previously discussed passage and sleeve 430 are shown in FIGS. 49-51, burner assembly 400' may be formed without these components and/or with any of the other elements, subelements and/or variations described and/or illustrated herein.

In FIG. 49, the burner assembly is shown including a vaporization heating assembly 296 that includes a plurality of ports, or mounts, 460 that are adapted to receive electrically powered heaters 462, such as electric resistance heaters. As shown, heating assembly 296 includes four ports 460, but it is within the scope of the disclosure that the number and configuration of the ports may vary. For example, even in the context of electrically powered resistance heaters, such heaters can have disc or flat configurations, as opposed to the cylindrical cartridge heaters shown in FIG. 50. Similarly, the power requirements and/or heat output of the heaters may affect the number and configuration of heaters to be used. In FIG. 50, heaters 462 are shown received within the ports and include electrical leads 464 that are connected to a source of electricity, such as a battery, fuel cell stack, electrical outlet, generator, etc.

Heating assembly 296 preferably heats the vaporized fuel stream to a sufficient temperature that the stream does not condense prior to being ignited in combustion region 92. As such, heating assembly 296 may be configured to superheat the vaporized fuel stream. For liquid combustible fuel streams containing methanol, or optionally methanol and up to 50 vol % water, four heaters 462 that are designed to output 100 watts at 10.6 volts have proven effective. It should be understood, however, that the number of heaters and/or amount of heat to be supplied therefrom will tend to vary depending upon the composition of the liquid combustible fuel stream, the flow rate thereof, and/or the configuration of the vaporization region. The heaters may be configured to provide a constant output, or alternatively may be selectively controlled to provide a selected amount of heat from within a predetermined range of outputs. For example, by selectively energizing between none and all of the heaters, the output of the heating assembly is varied. As another example, the power provided to the heaters may be controlled, such as by pulse width modulation of the DC voltage delivered thereto to selectively scale the power.

When heaters 462 are removably received within the vaporizing heating assembly, the heating assembly may (but is not required to) include a suitable retainer 466 that is adapted to retain the heaters therein and thereby prevent unintentional removal of the heaters. An illustrative example of a suitable retainer 466 is shown in FIGS. 50 and 51 in the form of a pin 468 that is selectively passed through guides 470 that are positioned so that the openings of the ports are at least partially obstructed by the pin after the pin is inserted through the guides. In such a configuration, vaporizing heating assembly 96 may include at least one such pin 468 at each end of the ports. As a variation of this configuration, the mounts may be keyed so that the heaters may only be inserted into (or removed from) one end of the ports. For example, one end of the ports may be obstructed, or even closed, so that the heaters cannot pass completely through the ports.

FIG. 50 also demonstrates an example of a modular, or cartridge-based, ignition source 88 that may be selectively inserted into and removed from operative positions relative to combustion region 92 via passage 422. As shown, the ignition source includes a housing 480 within which the particular igniting element(s) 482 is/are located. For example, housing 480 may contain a combustion catalyst, spark plug, electrically heated ceramic element, etc. As shown, housing 480 includes a mount 484 that is adapted to be releasably coupled to the burner assembly, such as to base 340.

In FIGS. 52 and 53, another example of a burner assembly 262 according to the present disclosure is shown and generally indicated at 500. In the illustrated embodiment, burner assembly 500 is adapted to receive a gaseous combustible fuel stream through fuel port 302 and an air stream through air port 320. However, it is within the scope of the disclosure that burner assembly 500 may additionally or alternatively receive a liquid combustible fuel stream through port 302 or an additional port within vaporization/staging region 292, with burner assembly 500 in such an embodiment also being heated such that the liquid fuel is vaporized in region 292. As perhaps best seen in FIG. 53, burner assembly 500 demonstrates a bifurcated, or distributed, air distribution chamber 322. More specifically, and as perhaps best seen in FIG. 53, an air stream is delivered into a primary distribution region 510, which in the illustrated embodiment takes the form of an annulus that surrounds tubes 314 and is separated therefrom by a wall structure 512. As shown, wall structure 512 includes a plurality of ports 514 through which the air stream may be introduced into a secondary distribution region 516, in which the air stream may flow around the tubes and be distributed between the apertures 326 in combustion distribution manifold 324. Preferably, ports 514 are spaced at intervals around wall structure 512 so that air entering region 510 is circulated within the region and introduced into secondary distribution region 516 from a plurality of radially spaced-apart ports. The distributed design of air distribution chamber 322 is designed to promote distribution of the air stream throughout region 516.

As discussed, burner assembly 500 may be adapted to receive and vaporize a liquid combustible fuel stream. An illustrative example of such a version of the burner assembly is shown in FIG. 54 and generally indicated at 500'. As shown in solid lines, the burner assembly includes a vaporizing heating assembly 296 and is adapted to receive a liquid combustible fuel stream through an input port, such as the port that was previously utilized for a gaseous combustible fuel stream in FIG. 52. When the burner assembly is adapted to selectively receive either or both of gaseous and liquid combustible fuel streams, vaporization region 292 will typically include a pair of fuel input ports, with the second such port indicated in dashed lines in FIG. 54. Although vaporizing heating assembly 296 has been illustrated in FIG. 54 as being mounted on, or integrated with, the rest of burner assembly 500', such as being within or forming a portion of a common shell or housing 402, it is within the scope of the disclosure that vaporizing heating assembly 296 may be a separate structure that is merely positioned to deliver sufficient heat to the vaporization region to vaporize the liquid combustible fuel stream. For example, instead of generating heat itself, such as electrically or through combustion, the heating assembly may deliver a heated fluid stream that vaporizes the liquid combustible fuel stream.

In operation, burner assemblies 262 according to the present disclosure that are adapted to receive a liquid combustible fuel stream (either alone or in combination with a gaseous combustible fuel stream) are typically preheated, such as by vaporizing heating assembly 296. A reason for preheating the burner assembly is so that the liquid combustible fuel stream does not fill or overflow the vaporization region while the region is heated. For most suitable liquid fuels, such as alcohols and shorter chain hydrocarbons, preheating the vaporization region to at least 150° C. and typically less than 500° C. has proven effective. Preheating the vaporization region to approximately 200-250° C. has proven particularly effective for methanol and methanol/water liquid combustible fuel streams. Although not required, it may be desirable to preheat the vaporization region to a temperature that will produce thin film boiling of the liquid combustible fuel stream that is delivered thereto.

Figure 55:
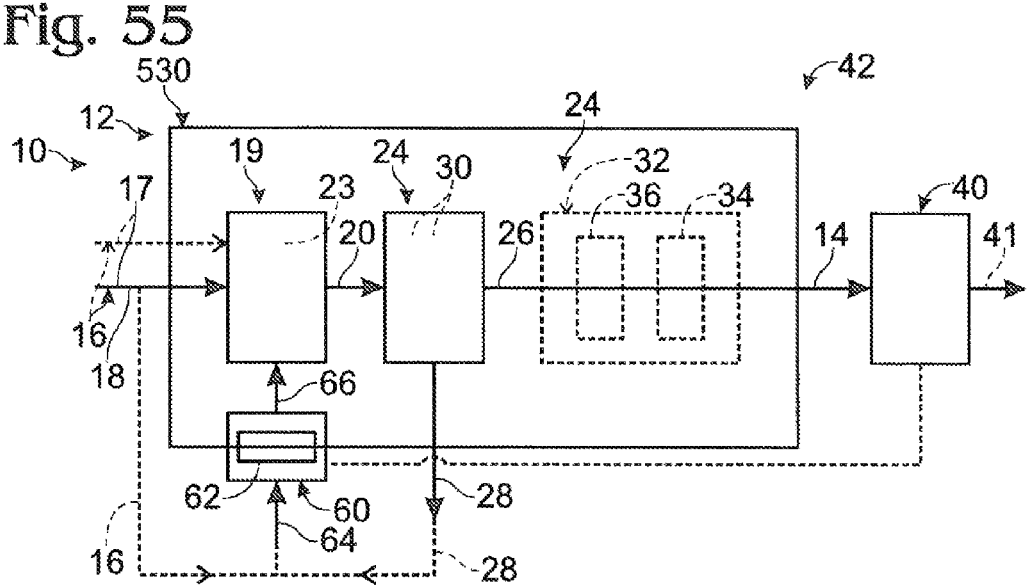
FIG. 55 is a schematic diagram of a steam reformer with a burner assembly according to the present disclosure.

As discussed, burner assemblies 262 according to the present disclosure may be used to heat the hydrogen-producing regions of a variety of fuel processors. For purposes of illustration, the following discussion will describe a liquid/gaseous burner assembly according to the present disclosure being used with a fuel processor in the form of a steam reformer that is adapted to receive a feed stream 16 containing a carbon-containing feedstock and water. However, it is within the scope of the disclosure that fuel processor 12 may take other forms, as discussed above. An example of a suitable steam reformer is schematically illustrated in FIG. 55 and indicated generally at 530. Reformer 530 includes a hydrogen-producing region 19 in the form of a reforming region that includes a steam reforming catalyst 23. In the reforming region, a resultant stream 20, which may in this context also be referred to as a reformate stream, is produced from the water and carbon-containing feedstock forming feed stream 16.

As discussed previously, feed stream 16 may be a single stream containing both water and a water-soluble carbon-containing feedstock, or it may be two or more streams that collectively contain the water and carbon-containing feedstock(s) that are consumed in the reforming region. As shown in dashed lines in FIG. 55, it is within the scope of the disclosure that at least the carbon-containing feedstock component of feed stream 16 may also form a combustible fuel stream 64 that is delivered to burner assembly 262. It is also within the scope of the disclosure that the complete feed stream (i.e. water and carbon-containing feedstock) may be used as the combustible fuel stream for burner assembly 262. For example, a reforming feed stream may contain approximately 50-75 vol % methanol and approximately 25-50 vol % water. An example of a particularly well-suited feed stream contains 69 vol % methanol and 31 vol % water. This stream may effectively be used as the feed stream for reformer 530 and the combustible fuel stream for a burner assembly according to the present disclosure. A benefit of this common feed/fuel is that the overall size of the fuel processing system may be reduced by not having to store and deliver a fuel stream 64 having a different composition than feed stream 16 (or its components).

When a burner assembly 262 is used to heat steam reformer 530 from an off, or cold, state, the burner assembly is initially preheated using vaporizing heating assembly 296. As an illustrative example, reformers that receive a feed stream 16 containing methanol will typically be preheated to at least 300° C., and more preferably, 325-350° C. After this temperature is reached, a liquid combustible fuel stream 82 is delivered to the vaporization region and vaporized, and an air stream 74 is delivered to distribution region 284. The vaporized fuel streams and air streams are distributed, diffused together and ignited, as discussed herein, with the resulting hot combustion stream 66 being used to heat at least the reforming region of steam reformer 530.

When the reforming region has been heated to a predetermined reforming temperature, which as discussed will tend to vary depending upon the composition of feed stream 16, feed stream 16 is delivered to the reforming region to produce reformate stream 20. Although feed stream 16 (or at least the carbon-containing feedstock component thereof) may continue to be used as the combustible fuel stream for the burner assembly, at least part, or even all, of the fuel stream may be formed by byproduct stream 28. In such an embodiment, the burner assembly will initially be used with a liquid combustible fuel stream during startup of the reformer, and then will be used with a gaseous burner assembly after the reforming region is preheated and producing a reformate stream.

Figure 56:
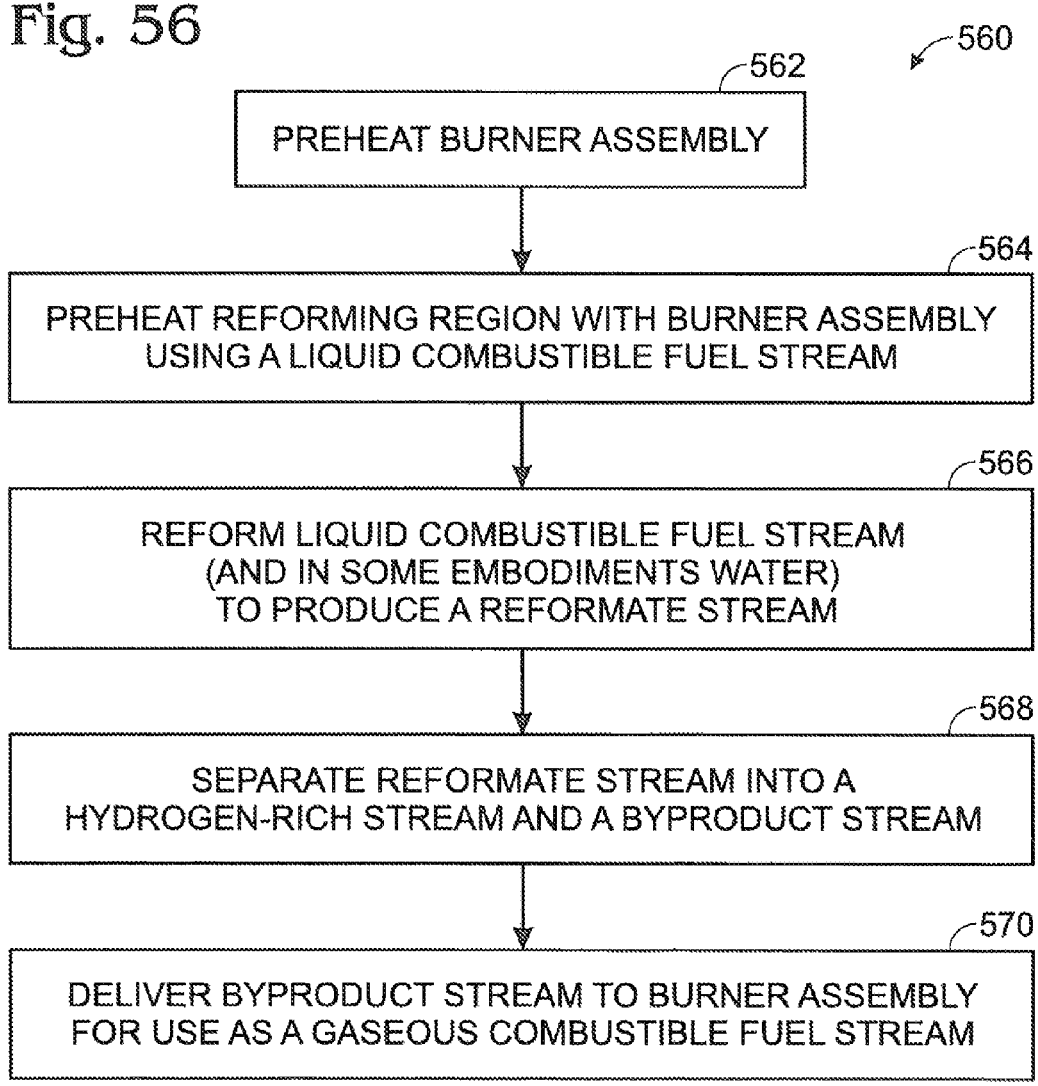
FIG. 56 is a flowchart showing illustrative methods for using burner assemblies according to the present disclosure.

This illustrative utilization of a burner assembly 262 is depicted in flow chart 560 in FIG. 56. As shown, at 562, the burner assembly is preheated. At 564, the burner assembly preheats the reforming region using a liquid combustible fuel stream. As discussed, this fuel stream may contain the same composition as the feed stream for the reformer. At 566, the preheated reforming region receives a feed stream containing a carbon-containing feedstock and water. The feed stream is reformed to produce a reformate stream containing hydrogen gas and other gases. At 568, the reformate stream is separated into a hydrogen-rich stream and a byproduct stream, and at 570, the byproduct stream is delivered to the burner assembly for use as a gaseous combustible fuel stream. If the byproduct stream contains sufficient heating value to maintain the reforming region at a suitable reforming temperature, then the flow of liquid combustible fuel stream may be stopped. When byproduct stream 28 does not contain sufficient heating value, it may be supplemented, such as with another gaseous combustible fuel stream (including a portion of reformate stream 20, hydrogen-rich stream 26 or product hydrogen stream 14) and/or the liquid combustible fuel stream may continue to be delivered to the burner assembly, typically at a reduced flow compared to its startup flow rate. It should be understood, however, that the above implementation is but one of many uses for burner assemblies according to the present disclosure.

INDUSTRIAL APPLICABILITY

Burner assemblies, steam reformers, fuel processing systems and fuel cell systems according to the present disclosure are applicable to the fuel processing, fuel cell and other industries in which hydrogen gas is produced, and in the case of fuel cell systems, consumed by a fuel cell stack to produce an electric current.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A fuel processor, comprising:
a hydrogen-producing region configured to receive a feed stream and to produce a mixed gas stream containing hydrogen gas and other gases therefrom;
at least one separation region configured to receive at least a portion of the mixed gas stream and to produce a hydrogen-rich stream containing at least substantially pure hydrogen gas and at least one byproduct stream containing at least a substantial portion of the other gases;
a diffusion burner assembly configured to produce a heated exhaust stream for heating at least the hydrogen-producing region of the fuel processor, wherein the diffusion burner assembly is configured to receive an air stream and a combustible fuel stream, and further wherein the diffusion burner assembly comprises:
a diffusion region configured to mix the combustible fuel stream and the air stream to form an oxygenated combustible fuel stream;
an air distribution chamber;
a diffusion structure configured to promote the formation of a plurality of oxygenated combustible fuel streams:
wherein the diffusion structure includes a fuel distribution manifold containing a plurality of fuel apertures that is configured to divide the combustible fuel stream into a plurality of combustible fuel streams, wherein the plurality of fuel apertures is in communication with a plurality of fuel tubes;
wherein the diffusion structure includes a combustion distribution manifold including a plurality of apertures that is configured to divide the air stream into a plurality of air streams, wherein each fuel tube of the plurality of fuel tubes is associated with one of the plurality of apertures; and further
wherein the plurality of fuel tubes extends at least partially through the air distribution chamber such that the air distribution chamber is configured to receive the air stream and to provide a fluid pathway for the air stream to flow around the plurality of fuel tubes;
a combustion region configured to receive the plurality of oxygenated combustible fuel streams, wherein the plurality of fuel tubes have fuel outlets configured to deliver the plurality of fuel streams to the combustion region, and further wherein the combustion distribution manifold separates the air distribution chamber from the combustion region; and
at least one ignition region configured to initiate combustion of the plurality of oxygenated combustible fuel streams.

2. The fuel processor of claim 1, wherein each of the plurality of air streams contains no more than 10% of the air stream.

3. The fuel processor of claim 1, wherein each of the plurality of combustible fuel streams contains no more than 10% of the combustible fuel stream.

4. The fuel processor of claim 1, wherein each fuel outlet extends at least partially through one of the plurality of apertures.

5. The fuel processor of claim 1, wherein each fuel outlet extends through one of the plurality of apertures.

6. The fuel processor of claim 1, wherein the combustion manifold is configured to maintain the air distribution chamber at a pressure that is greater than the pressure within the combustion region.

7. The fuel processor of claim 1, wherein the diffusion burner assembly is configured to receive the combustible fuel stream in the form of a liquid combustible fuel stream, and further wherein the diffusion burner assembly includes a vaporization region that is configured to vaporize the liquid combustible fuel stream.

8. The fuel processor of claim 7, wherein the vaporization region includes at least one reservoir configured to receive a volume of the liquid combustible fuel stream.

9. The fuel processor of claim 7, wherein the fuel distribution manifold is configured to maintain the vaporization region at a pressure that is greater than the pressure in the plurality of fuel tubes.

10. The fuel processor of claim 1, wherein the diffusion burner assembly is configured to receive the combustible fuel stream in the form of a gaseous combustible fuel stream.

11. The fuel processor of claim 10, wherein the gaseous combustible fuel stream includes at least a portion of the byproduct stream.

12. The fuel processor of claim 1, wherein at least one of the fuel stream and the feed stream further comprise at least one additional component.

13. The fuel processor of claim 1, wherein the fuel processor is configured to produce the mixed gas stream via a steam reforming reaction, wherein the hydrogen-producing region includes at least one reforming region that contains a reforming catalyst, and further wherein the feed stream contains water and a carbon-containing feedstock.

14. The fuel processor of claim 13, wherein the fuel processor includes a vaporization region in which the feed stream is vaporized at least partially responsive to thermal contact with the heated exhaust stream from the burner assembly.

15. The fuel processor of claim 1, wherein the burner assembly is further configured to receive a gaseous fuel stream.

16. The fuel processor of claim 1, wherein the burner assembly is further configured to receive at least a portion of the byproduct stream as a gaseous fuel stream.

17. The fuel processor of claim 1, wherein the burner assembly is configured to receive up to 5 times a flow rate of the air stream that is stoichiometrically required to combust a given flow rate of the combustible fuel stream.

18. The fuel processor of claim 1, wherein the fuel processor is configured to control a flow rate of the air stream to selectively increase or decrease a temperature of the heated exhaust stream for heating at least the hydrogen-producing region of the fuel processor.

19. An energy producing assembly comprising:
the fuel processor of claim 1; and
a fuel cell stack configured to receive an oxidant stream and the hydrogen-rich stream and to produce an electric current therefrom.

* * * * *

UNITED STATES PATENT AND TRADEMARK OFFICE
CERTIFICATE OF CORRECTION

PATENT NO. : 8,696,772 B2
APPLICATION NO. : 13/166576
DATED : April 15, 2014
INVENTOR(S) : David J. Edlund et al.

Page 1 of 1

It is certified that error appears in the above-identified patent and that said Letters Patent is hereby corrected as shown below:

On The Title Page, Item (62)

Under "Related U.S. Application Data" on line 7, after "application No. 10/412,709, filed on" delete "April 20, 2003", and insert --April 10, 2003-- therefor.

Signed and Sealed this
Fifteenth Day of March, 2016

Michelle K. Lee
*Director of the United States Patent and Trademark Office*